United States Patent
Lasko et al.

(10) Patent No.: US 11,397,419 B2
(45) Date of Patent: Jul. 26, 2022

(54) ELECTRICAL STATUS INDICATION SYSTEM

(71) Applicant: Rockwell Automation Technologies, Inc., Mayfield Heights, OH (US)

(72) Inventors: Scott B. Lasko, Milwaukee, WI (US); Troy M. Bellows, Milwaukee, WI (US); Maciej Branicki, Katowice (PL); Claudio Di Stefano, Milan (IT); Karen R. Hecht, Milwaukee, WI (US); Mayo D. Hemmingson, Milwaukee, WI (US); David Main-Reade, Edinburgh (GB); Ian Murgatroyd, Kiln Farm (GB); Stephen Pethick, Kiln Farm (GB); Austen K. Scudder, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 384 days.

(21) Appl. No.: 16/580,987

(22) Filed: Sep. 24, 2019

(65) Prior Publication Data
US 2021/0089004 A1  Mar. 25, 2021

(51) Int. Cl.
*G01R 31/56* (2020.01)
*G05B 19/4155* (2006.01)
(Continued)

(52) U.S. Cl.
CPC ........... *G05B 19/4155* (2013.01); *G08B 5/36* (2013.01); *G08B 21/18* (2013.01); *G05B 2219/31229* (2013.01)

(58) Field of Classification Search
USPC ....... 340/638, 639, 648, 662, 440, 448, 463, 340/488, 507, 509, 539.22, 545.6, 675,
(Continued)

(56) References Cited

U.S. PATENT DOCUMENTS 5,902,973 A * 5/1999 Ramey ................... H01H 71/56
200/50.01
5,986,557 A * 11/1999 Clarke ................... H02H 3/046
340/638

(Continued)

FOREIGN PATENT DOCUMENTS

CN 205595754 U 9/2016
CN 107675943 A 2/2018
(Continued)

OTHER PUBLICATIONS

Rockwell Automation; "Operating Handle;" Oct. 1, 2018, 2 pages.
(Continued)

*Primary Examiner* — Daniel Previl
(74) *Attorney, Agent, or Firm* — Fletcher Yoder, P.C.

(57) ABSTRACT

Embodiments of this present disclosure may include a handle disposed on an outer surface of a housing of electrical circuitry. The handle may provide access to at least a portion of the electrical circuitry. The handle may include a status indicator that emits light in response to a control signal from control circuitry. The status indicator may be disposed around the handle. The control circuitry may detect a state of the electrical protection circuitry. The control circuitry may also transmit the control signal to the status indicator based on the state. The control signal may control one or more properties of the light emitted by the status indicator, and thus indicate to an operator the state of the electrical circuitry.

21 Claims, 16 Drawing Sheets

(51) Int. Cl.
*G08B 5/36* (2006.01)
*G08B 21/18* (2006.01)

(58) Field of Classification Search
USPC .................................................. 340/676, 679
See application file for complete search history.

(56) References Cited

U.S. PATENT DOCUMENTS

| | | | |
|---|---|---|---|
| 6,448,785 | B1 | 9/2002 | Rohmer et al. |
| 8,130,001 | B1 | 3/2012 | Dutta et al. |
| 8,320,147 | B2 | 11/2012 | Homyk |
| 9,613,198 | B2 | 4/2017 | Gandhi et al. |
| 9,904,336 | B1* | 2/2018 | Khan ................ H05K 7/20172 |
| 10,025,300 | B2 | 7/2018 | Michalscheck et al. |
| 2002/0034321 | A1 | 3/2002 | Saito et al. |
| 2004/0164615 | A1 | 8/2004 | Alexandropoulos |
| 2007/0055889 | A1 | 3/2007 | Henneberry et al. |
| 2013/0169815 | A1 | 7/2013 | Carney et al. |
| 2017/0098520 | A1* | 4/2017 | Mittelstadt ............. H01H 71/10 |
| 2017/0269128 | A1 | 9/2017 | Bugaris et al. |
| 2017/0372856 | A1 | 12/2017 | Singh et al. |
| 2018/0090292 | A1* | 3/2018 | Zhang ................ H01H 83/226 |
| 2018/0114661 | A1* | 4/2018 | Roopnarine ......... H01H 71/521 |
| 2018/0321661 | A1 | 11/2018 | Main-Reade et al. |
| 2019/0213818 | A1 | 7/2019 | Einberg |
| 2019/0251765 | A1* | 8/2019 | Masters ................ H04L 63/08 |
| 2021/0088999 | A1 | 3/2021 | Main-Reade et al. |

FOREIGN PATENT DOCUMENTS

| | | |
|---|---|---|
| DE | 19651821 A1 | 6/1998 |
| EP | 3528064 A1 | 8/2019 |

OTHER PUBLICATIONS

Rockwell Automation; "External Rotary Operating Handle Family;" May 2013; 2 pages.
Grace PESDs; "Voltage Indicators;" Grace Engineered Products, Inc; https://cdn2.hubspot.net/hubfs/477905/GracePESDs%20/SS-VI-DS-EN%201804_LR.pdf?_hstc=22827620. d1df5ce2b2b102c7c95f1950ead14874.1571328293319. 1571328293319.1571328293319.1&_hssc=22827620.1. 1571342869045&_hsfp=4161158777&hsClaTracking-f48406dc-1919-4eca-bd43-5c04cc66ad45%7Cd4169190-a88c-4e5a-9d9e-db2e4808cde2; last accessed Sep. 23, 2019; 4 pages.
Siemens; "Data Sheet;" last modified Oct. 3, 2019; 4 pages.
Panduit; "VeriSafe Absence of Voltage Tester;" Pre-Release Product Bulletin; Sep. 8, 2016; 8 pages.
Safeside; "Thru-Door Voltage Indicator, Flashing and Non-Flashing;" Grace Engineered Products, Inc; 2014; 2 pages.
Pizzato Elettrica; "Safety Handles, P-KUBE Krome;" https://www.pizzato.com/download/download_file.aspx?m=9&f=130&I=2; 2018; 2 pages.
Pandit; "VeriSafe AVT;" Absence of Voltage Tester Instruction Manual; Apr. 2018; 21 pages.
Panduit; "VeriSafe Absence of Voltage Tester;" Product Bulletin; Jun. 2017; 8 pages.
International Organization for Standardization; "Safety of Machinery—Safeguarding supportive system;" Jan. 3, 2019; 29 pages.
ISO; "Safety of Integrated Manufacturing Systems;" Jan. 3, 2019; 29 pages.
Partial European Search Report for Application No. 20189730.3 dated Feb. 8, 2021, 13 pages.
Extended European Search Report for Application No. 20189730.3 dated Apr. 12, 2021, 15 pages.
Partial European Search Report for Application No. 20189277.5 dated Feb. 2, 2021, 14 pages.
Extended European Search Report for Application No. 20189277.5 dated Apr. 6, 2021, 15 pages.
Communication pursuant to Article 94(3) EPC for EP Application No. 20189730.3 dated Dec. 3, 2021, 5 pages.
Communication pursuant to Article 94(3) EPC for EP Application No. 201892//.5 dated Dec. 2, 2021, 6 pages.

* cited by examiner

ELECTRICAL STATUS INDICATION SYSTEM

BACKGROUND

This disclosure relates generally to systems and methods for providing an electrical status indication system within an industrial automation system. More particularly, embodiments of the present disclosure are directed toward systems to provide visual indicator of electrical statuses associated with an operation of an industrial automation system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, or the like. One or more components of the automation control and monitoring systems, such as programming terminals, automation controllers, input/output (I/O) modules, communication networks, human-machine interface (HMI) terminals, and the like, may use the statuses and/or received information to provide alerts to operators to change or adjust operation of one or more components of the industrial automation system (e.g., such as adjusting operation of one or more actuators), to manage the industrial automation system, or the like.

The components described above may receive electrical power from a power supply, such as a generator or another electrical power supply. Electrical power may be distributed through the industrial automation system via an electrical power distribution network. To improve operation of the industrial automation system and of the electrical power distribution network, electrical protection circuitry may be included within the industrial automation system. The electrical protection circuitry may interfere with (e.g., protect) the electrical power distribution network in the event of a fault, a fault condition being detected, and/or in response to an operator "locking out" or electrically isolating at least a portion of the industrial automation system from the electrical power distribution network. However, the status of the electrical protection circuitry, such as whether an example electrical protection circuit is open or closed, may be not be easily determined based on an initial inspection of the component. As such, it may be useful to improve the status indicators associated with various components of the industrial automation system.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include electrical protection circuitry coupled between a power supply and a load. The electrical protection circuitry may electrically couple the power supply to the load. The system may also include a handle disposed on an outer surface of a housing of the electrical protection circuitry. The handle may provide access to at least a portion of the electrical protection circuitry. The system may also include a status indicator that emits light in response to a control signal. The status indicator may be disposed around the handle. The system may also include control circuitry that detects a state of the electrical protection circuitry and transmits the control signal to the status indicator based on the state. The control signal may control one or more properties of the light emitted by the status indicator.

In another embodiment, a device may include a handle disposed on a handle base. The handle may rotate about an axis central to the handle base. The device may also include a status indicator light that emits light. The status indicator light may receive power from electrical supply circuitry disposed within electrical circuitry housing. The status indicator light may be disposed around the handle base and may fit within a bezel region disposed at least partially between the handle base and an outer surface of an electrical circuitry housing when the handle is positioned on an opening of the electrical circuitry housing.

In yet another embodiment, a tangible, non-transitory computer-readable medium may store instructions executable by a processor of an electronic device that, when executed by the processor, cause the processor to receive a first state of an electrical device. The electrical device may couple a power supply to a load. The computer-readable medium may also store instructions executable by the processor that, when executed, cause the processor to receive a current handle position associated with the electrical device. A handle may provide access to at least a portion of the electrical device based at least in part on the current handle position. The computer-readable medium may also store instructions executable by the processor that, when executed, cause the processor to transmit a control signal to a status indicator based on the first state or the current handle position. The control signal may control one or more properties of light emitted by the status indicator. The status indicator may be disposed adjacent to the handle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
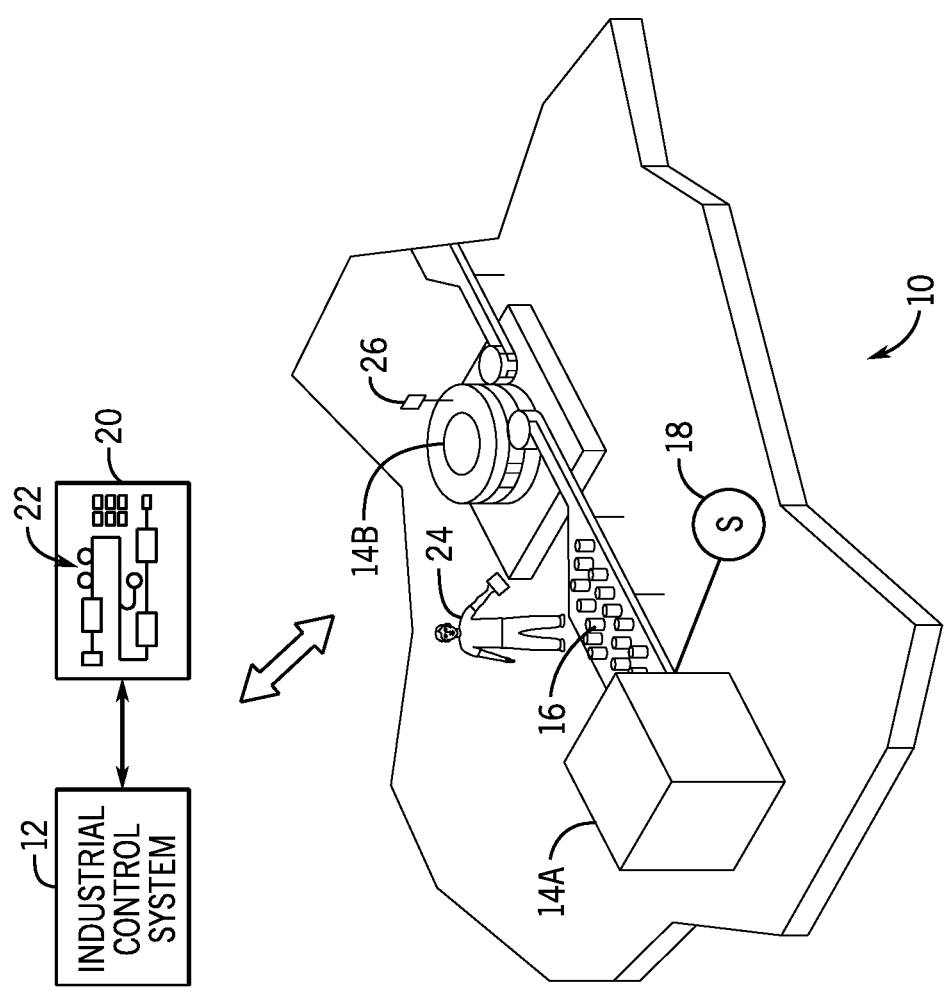
FIG. 1 is a perspective view of an example industrial automation system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards systems and methods that enable providing a visual indicator of electrical statuses associated with an operation of an industrial automation system. Industrial automation systems may include automation control and monitoring systems (e.g., industrial control systems). The automation control and monitoring systems may monitor statuses and/or receive information from a wide range of devices, such as valves, electric motors, a wide range of sensors, other suitable monitoring devices, or the like. These components may receive electrical power from a power source of the industrial automation system (e.g., common power supply, generator). The electrical power may be distributed through the industrial automation system via an electrical power distribution network. The electrical power distribution network may include electrical protection circuitry designed to protect the industrial automation system from fault conditions, faults, or otherwise undesirable operation. For example, the electrical protection circuitry may be a switch (e.g., circuit breaker, fused switch) that electrically isolates a portion of the electrical power distribution network from the rest of the electrical power distribution network in response to detecting a fault, a fault condition, and/or in response to an operator "locking out" or electrically isolating at least a portion of the industrial automation system from the electrical power distribution network.

An operator of the industrial automation system may rely on suitable operation of the electrical protection circuitry to perform some operations on or within the industrial automation system. To do so, sometimes the operator may operate on or adjust a machine of the industrial automation system. However, an operator may not wish to operate on a machine while the machine is still electrically coupled to the electrical power distribution network. Machines electrically coupled to the electrical power distribution network (and thus a power supply) are still "hot" (e.g., electrically energized) or receiving electrical power and represent a consideration that an operator is to take into account when performing operations within the industrial automation system. Furthermore, some electrical operating guidelines (e.g., National Fire Protection Association (NFPA) 70E standard) define under which operating conditions an operator is permitted to enter into or operate on a component or portion of the industrial automation system. In general, an operator may wish to delay interacting with a component of the industrial automation system until the component is verified to be electrically decoupled from the electrical power distribution network and/or until a status of the component is verified such that suitable precautions may be taken.

Verification operations may include the operator manually testing (e.g., measuring) a voltage associated with the electrical protection circuitry to determine whether the component is suitably isolated from the electrical power distribution network. However, these verification operations may expose the operator to undesirably high voltages and may be performed while the operator wears protective equipment (e.g., fire-retardant or electrically resistant clothing) before making the measurement.

An electrical status indication system, however, may improve these verification operations. The electrical status indication system may electrically couple to one or more portions or components of the electrical protection circuitry and provide a real-time operational status to the operator of a state or current operation of the electrical protection circuitry. Thus, the operator, instead of performing verification operations to determine the state or current operation, may use the indication of the state or current operation provided by the electrical status indication system.

To perform the verification operations, the electrical status indication system may test a known voltage to verify suitable operation of a sensing device, then may test a voltage of the component to verify an operation of a component, and finally may retest the known voltage to repeat verification of suitable operation of the sensing device. When the sensing device is verified before and after a voltage measurement, the electrical status indication system verifies that the sensing device operated suitably during the measurement of the voltage, and thus may be used to determine control operations.

The electrical status indication system may include a handle of the electrical protection circuitry that includes light-emitting components (e.g., light-emitting diodes (LEDs), LED strips, light bulbs, or the like) to visually communicate the current operation of the electrical protection circuitry to an observer. In this way, an operator standing at a distance from the electrical protection circuitry may be able to determine the current operation of the electrical protection circuitry without actually opening a housing of the electrical protection circuitry. This may be especially useful in fault conditions or during an abnormal or unexpected operation since the operator may remain a suitable distance away from the electrical protection circuitry when determining or monitoring a current operation of the electrical protection circuitry.

The handle and the light-emitting components may be an existing handle of the electrical protection circuitry. In some cases, the light-emitting components of the electrical status indication system may be mounted in a bezel (e.g., around a base of the handle) that has been retrofitted onto the handle of the electrical protection circuitry housing. When the light-emitting components are retrofitted, no additional mechanical alterations may be performed to the electrical protection circuitry housing to accommodate the light-emitting components of the electrical status indication system. Furthermore, when the light-emitting components are retrofitted on the handle, the light-emitting components may be installed around the handle after a time of initial manufacturing of the handle. The light-emitting components may operate in response to a control signal from a control system of the electrical status indication system. The control system may reference a current operation of the electrical protection circuitry and a current position of the handle to determine a light emission pattern for the light-emitting components.

In some cases, the handle of the electrical status indication system may detect when an operator is attempting to access or change an operation of the electrical protection circuitry. The control system of the electrical status indication system may receive a control signal from the handle and information associated with the operator, and may communicate with the industrial control system of the industrial automation system to determine whether to permit the operator to access or change the operation of the electrical protection circuitry. In this way, the handle and the control system may authenticate an operator to use the electrical protection circuitry. In some cases, additional sensing inputs from sensors of the industrial control system and/or the current operation of the electrical protection circuitry may be considered when determining to authenticate the operator.

Additionally or alternatively, the control system may receive a handle position status from the handle indicating a current position of the handle. The control system may use the handle position status to determine whether to alert the industrial control system of the current operation of the electrical protection circuitry. Furthermore, in some examples, the control system may use the handle position status, a line side status indicative of whether a line side of the electrical protection circuitry receives electrical power from the electrical power distribution network, a load side status indicative of whether a load side of the electrical protection circuitry receives electrical power from the electrical power distribution network, and/or an additional parameter to determine whether to alert the industrial control system of the current operation of the electrical protection circuitry. For example, the control system may transmit an alarm to the industrial control system when the line side status is "on," the load side status is "on," and the handle position is "off" since this combination of statuses indicates an abnormal or unexpected operation that is to be investigated further by the industrial control system or by an operation via alert by the industrial control system By way of introduction, FIG. 1 is a perspective view of an example industrial automation system 10. The industrial automation system 10 may be controlled by an industrial control system 12. In addition, the industrial automation system 10 may include stations having machine components and/or machines to conduct a particular function within an automated process, for example, an automated assembly line. The example automated process of the industrial automation system 10 may begin at a station 14A used for loading objects, such as empty cans or bottles to be filled, into the industrial automation system 10 via a conveyor section 16. The conveyor section 16 may transport the objects to a station 14B to perform a first action, for example, washing the empty cans and/or bottles. As objects exit from the station 14B, the conveyor section 16 may transport the objects to subsequent stations 14 to continue the manufacturing or assembly process. Clearly, for other applications, the particular system, machine components, machines, stations, and/or conveyors may be different or specially adapted to the application. In addition to the equipment described above, the industrial automation system 10 may also include motors, protection devices, switchgear, compressors, and the like.

One or more properties of components of the industrial automation system 10 may be monitored and controlled by an industrial control system 12 for regulating control variables. For example, sensing devices (e.g., sensors 18) may monitor various properties of the industrial automation system 10 and generate outputs used during adjustments of the operation of the industrial automation system 10. Scanners, gauges, valves, flow meters, and the like of the industrial automation system 10 may each generate sensing data. Sensing data may include digital or analog values representative of a sensed voltage, current, pressure, moisture level, audio level, containment level, or any other suitable parameter associated with an operation of the industrial automation system 10. The sensing data may be of any suitable format, and thus may include one or more analog electrical signals, digital data signals, pulse-width-modulated data signals, or the like. Furthermore, the input/outputs between the industrial control system 12 and the sensors 18 may be outfitted for wireless communication in addition to or instead of wired communication. Thus, the sensed data may sometimes be transmitted via wireless and/or radio frequency signals.

The sensing data is used by the industrial control system 12 to determine operational adjustments the industrial automation system 10. These adjustments may be managed via control loops. For example, a control loop may include a control system coupled to a motor drive, where the control system may adjust operations of the motor drive based on sensing data received from one or more sensors 18.

The industrial control system 12 may be communicatively coupled to a display/operator interface 20 (e.g., a human/ machine interface (HMI)) and to one or more devices of the industrial automation system 10. The industrial control system 12 may represent components of the industrial automation system 10 through visualizations 22 of the components on the display/operator interface 20. The industrial control system 12 may use data transmitted by sensors 18 to update visualizations of the components via changing one or more indications of current operations of the components. These sensors 18 may be any device adapted to provide information regarding process conditions. An operator 24 monitoring the industrial automation system 10 may reference the display/operator interface 20 to determine various statuses, states, and/or current operations or when adjusting operations of the industrial automation system 10 and/or for a particular component.

The industrial control system 12 may use networked devices 26 in managing operation of the industrial control system 12. The networked devices 26 may be any suitable device within the industrial automation system 10 that communicates a status, a data packet, an alert, or the like, to the industrial control system 12 and/or to other networked devices 26. The networked devices 26 may each include processing circuitry coupled to an example sensor 18 that enables transmission of sensing data (e.g., sensed data) to the industrial control system 12.

Figure 2:
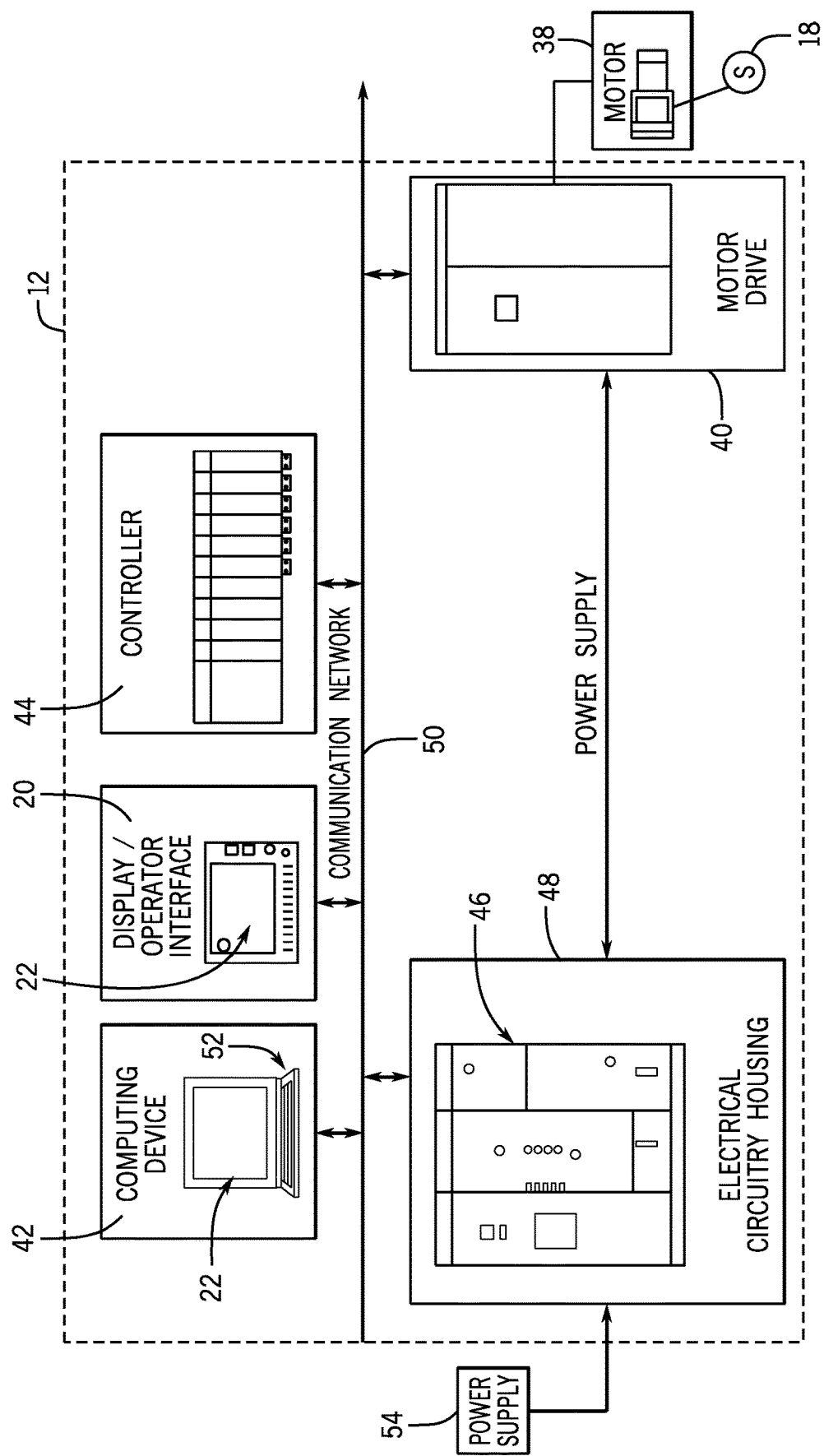
FIG. 2 is a block diagram of an example industrial control system of the industrial automation system of FIG. 1, in accordance with an embodiment.

To help elaborate, FIG. 2 is a block diagram of an example industrial control system 12 coupled to a motor 38 (e.g., a load) and operable to control the motor 38 via a motor drive 40. The industrial control system 12 may also include a computing device 42, the display/operator interface 20, a control system 44, and electrical protection circuitry 46 within electrical circuitry housing 48. It is noted that although described herein as housing the electrical protection circuitry 46, the electrical circuitry housing 48 may store within any suitable electrical circuitry in addition to or instead of the electrical protection circuitry 46. Thus, embodiments described herein may also be used with the electrical circuitry internal to the electrical circuitry housing 48. These components of the industrial control system 12 may communicate (e.g., intercommunicate) via a communication network 50. The communication network 50 of the industrial control system 12 may be a wired network, a wireless network, and/or a combination of the two. Since the motor drive 40, the computing device 42, the display/operator interface 20, the control system 44, and the electrical protection circuitry 46 communicate via the communication network 50, these may each be examples of networked devices 26.

The industrial control system 12 may receive various outputs from sensors 18, outputs from components, or the like, and use the inputs when making a control decision regarding an operation of at least a portion of the industrial automation system 10. For example, the industrial control system 12 may receive a sensor reading associated with an operation of the motor 38 and use the sensor reading (e.g., a sensed parameter) when determining how to control or operate the motor 38. The sensor 18 may sense an internal operating parameter, an external operating parameter, a supply operating parameter, and/or an ambient condition parameter when monitoring the motor 38 or other components of the industrial automation system 10.

Outputs from the sensors 18 may be received by components of the industrial control system 12. A component of the industrial control system 12 may generate an output in response to the input sensing data from the sensors 18. The output from the component may help determine changes to control operations. For example, the control system 44 may receive sensed data and compare the sensed data against one or more thresholds to determine how to change an operation of the industrial automation system 10.

As such, the industrial control system 12 may include any suitable number of computing devices, controllers, drivers, processing circuitry, or the like that have communication abilities, processing abilities, and the like. For example, the control system 44 may be any suitable processing circuitry including a programmable logic controller (PLC), a programmable automation controller (PAC), or any other controller that may monitor, control, and operate an industrial automation device or component. The industrial control system 12 may be incorporated into any physical device (e.g., the industrial automation components) or may be implemented as a stand-alone computing device (e.g., general purpose computer), such as a desktop computer, a laptop computer, a tablet computer, a mobile device computing device, or the like. In this way, the computing device 42, in some cases, may be the industrial control system 12. However, as depicted, the industrial control system 12 includes the computing device 42 as a networked device 26.

Industrial automation components may include a user interface (e.g., display/operator interface 20), an industrial control system (e.g., industrial control system 12), a drive (e.g., motor drive 40), a motor (e.g., motor 38), a conveyor (e.g., conveyor section 16), and any other device that may enable an industrial automation system to produce or manufacture products or process certain materials. In addition to the aforementioned types of industrial automation components, the industrial automation components may also include one or more controllers (e.g., control system 44), input/output (I/O) modules, motor control centers, human machine interfaces (HMIs), user interfaces, contactors, starters, sensors, relays, protection devices, switchgear, compressors, network switches (e.g., Ethernet switches, modular-managed, fixed-managed, service-router, industrial, unmanaged, etc.), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, flow meters, and the like.

The computing device 42, in some examples, may receive operation instructions via one or more inputs (e.g., inputs to input devices 52, such as a keyboard or mouse). The operation instructions may indicate a manner in which it is desired that the motor 38 or motor drive 40 is operated. For example, the operation instructions may include an instruction to operate the motor 38 at a relatively faster speed. In response to receiving the operation instructions, the computing device 42 may generate a control signal to implement the operation change of the operation instruction. The computing device 42 may transmit the control signal to the control system 44. The control system 44 may use (e.g., immediately use) the control signal to generate another control signal to send to the motor drive 40 and/or the electrical protection circuitry 46.

In some cases, the control system 44 may use one or more sensed parameters when determining to instruct the electrical protection circuitry 46 and/or the motor drive 40 in response to the control signal. In this way, the control system 44 may verify that a particular operation is suitable to be implemented given current operating conditions. For example, the control system 44 may verify that a certain combination of operating conditions are conducive to a particular instruction. Eventually, when the control system 44 deems suitable to change operation of the industrial automation system 10, the control system 44 may transmit a control signal to one or more components of the industrial automation system 10. For example, the control system 44 may transmit a control signal to the electrical protection circuitry 46 when the operation instruction indicated a change to a power supplied to the load, such as via power supply 54, or an electrical isolation of a portion of the industrial automation system 10 is requested. However, if a change to the speed or frequency of the motor 38 is requested via the operation instruction, the control system 44 may transmit a control signal to the motor drive 40 to implement the operational instruction.

The electrical protection circuitry 46 may include any suitable switching circuitry that is used to electrically isolate at least a portion of the industrial automation system 10 from the power supply 54. For example, the electrical protection circuitry 46 may include one or more circuit breakers, disconnect switches, fused disconnect switches, switches, or the like. The electrical isolation may be performed by opening a switch or otherwise electrically decoupling an electrical connection between the electrical protection circuitry 46 from the power supply 54 (e.g., electrical waveforms) from an output from the electrical protection circuitry 46. By electrically isolating at least a portion of the industrial automation system 10, faults or otherwise undesirable operations may be avoided. For example, faulty equipment may be detected, and as such, may be electrically isolated before a fault or otherwise undesired operation of the faulty equipment occurs.

Figure 3:
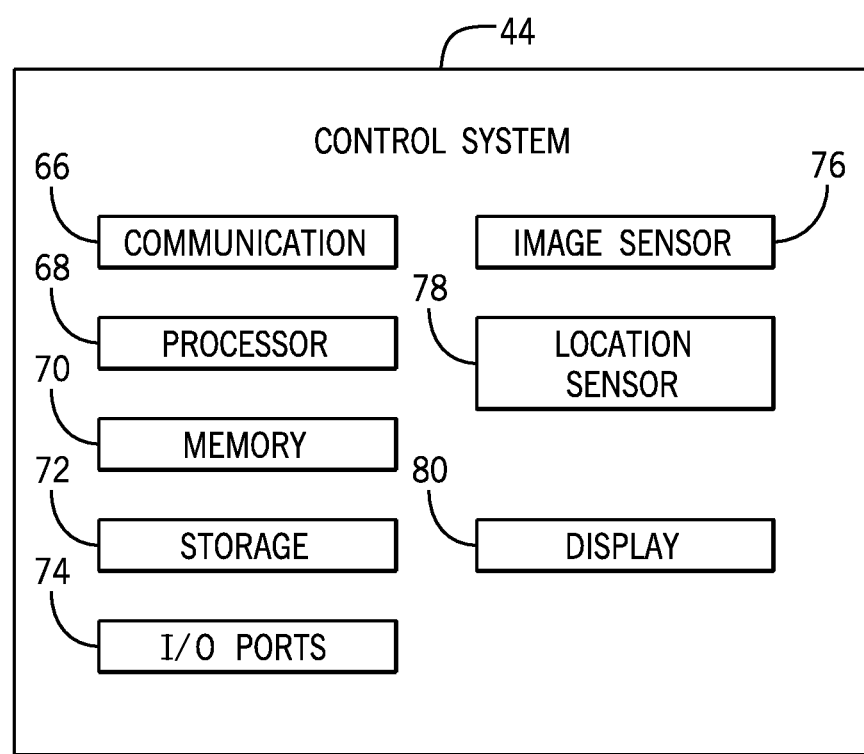
FIG. 3 is a block diagram of an example control system of the industrial control system of FIG. 2, in accordance with an embodiment.

FIG. 3 is a block diagram of example components within one or more components of the industrial automation system 10, such as the control system 44, which may be used to perform one or more of the operations described herein. By way of example, the control system 44 may include a communication component 66, a processor 68, a memory 70, a storage 72, input/output (I/O) ports 74, an image sensor 76 (e.g., a camera), a location sensor 78, a display 80, additional sensors (e.g., vibration sensors, temperature sensors), and the like. The communication component 66 may be a wireless or wired communication component that may facilitate communication between the industrial automation components, the industrial control system 12, and other communication capable devices. Although depicted as coupled to other components of the industrial control system 12, it should be understood that one or more control systems 44 may be associated with any component of the industrial control system 12. For example, a relay and/or control system circuitry of the electrical protection circuitry 46 may include one or more control systems 44 operable according to instructions stored in memory 70 to perform one or more protective operations, such as detecting faults or otherwise determining when to operate a switch of the electrical protection circuitry 46 open or closed.

The processor 68 may be any type of computer processor or microprocessor capable of executing computer-executable code. The processor 68 may also include multiple processors that may perform the operations described below. The memory 70 and the storage 72 may be any suitable articles of manufacture that may serve as media to store processor-executable code, data, or the like. These articles of manufacture may represent computer-readable media (e.g., any suitable form of memory or storage) that may store the processor-executable code used by the processor 68 to perform the presently disclosed techniques. Generally, the processor 68 may execute software applications that include programs that enable a user to track and/or monitor operations of the industrial automation components via a local or remote communication link.

The memory 70 and the storage 72 may also be used to store the data, analysis of the data, the software applications, and the like. The memory 70 and the storage 72 may represent non-transitory computer-readable media (e.g., any suitable form of memory or storage) that may store the processor-executable code used by the processor 68 to perform various techniques described herein. It should be noted that non-transitory media merely indicates that the media is tangible and not a signal.

In one embodiment, the memory 70 and/or storage 72 may include a software application that may be executed by the processor 68 and may be used to monitor, control, access, or view industrial automation equipment. The memory 70 may be used to store the processor-executable instructions for determining when to actuate a handle of the electrical circuitry housing 48. For example, the instructions may specify that credentials of the operator are authorized and certain steps of the lockout-tagout procedures are completed prior to sending an actuation signal to components (e.g., a handle, internal locking device) disposed on or within the electrical circuitry housing 48, the electrical protection circuitry 46, and the like.

The I/O ports 74 may be interfaces that may couple to other peripheral components such as input devices 52, sensors 18, input/output (I/O) modules, and the like. I/O modules may enable the control system 44 to communicate with the industrial automation equipment or other devices in the industrial automation system via the I/O modules.

The image sensor 76 may include any image acquisition circuitry such as a digital camera capable of acquiring digital images, digital videos, or the like. The location sensor 78 may include circuitry designed to determine a physical location of the control system 44. In one embodiment, the location sensor 78 may include a global positioning system (GPS) sensor that acquires GPS coordinates on behalf of the control system 44. In another embodiment, the location sensor 78 may include other circuitry such as a radio wave transmitter, an infrared sensor, and the like that may acquire data that may be used to determine a location of a target with respect to other industrial automation machinery or other fixtures in the industrial automation system. In certain embodiments, the control system 44 may also include various other sensors 18 that may provide additional data related to an environment in which the networked devices 26 exists. For instance, the other sensors 18 may include an accelerometer, a gas (e.g., smoke, carbon monoxide) sensor, or the like. The sensors 18, the location sensor 78, and/or the image sensor 76 may each generate sensing data to be used to determine whether to authenticate an operator 24 to using a portion of the industrial automation system 10 and/or or determine an operational status of a portion of the industrial automation system 10, as described herein.

The display 80 may depict visualizations associated with software or executable code being processed by the processor 36, such as via the display/operator interface 20. As such, the display 80 may serve as a user interface to communicate with the industrial automation equipment. The display 80 may be used to display a graphical user interface (GUI) for operating industrial automation equipment, for tracking the maintenance of industrial automation equipment, performing various procedures (e.g., lockout-tagout, placing device offline, replacing component, servicing device) for industrial automation equipment, and the like. The display 80 may be any suitable type of display, such as a liquid crystal display (LCD), plasma display, or an organic light emitting diode (OLED) display. In one embodiment, the display 80 may be a touch display capable of receiving inputs from the operator 24. The display 80 may be provided in conjunction with a touch-sensitive mechanism (e.g., a touch screen) that may function as part of a control interface for the industrial automation equipment. In some embodiments, the operator interface may be characterized as the display/operator interface 20, or another suitable interface.

During operation of the industrial automation system 10, sometimes the operator 24 may implement a control operation or verify a control decision of the industrial control system 12. This may be facilitated via interaction of the operator 24 to the display/operator interface 20, the display 80, the I/O ports 74, input devices 52, or the like. As an example, the operator 24 may verify an operation of a load of the electrical protection circuitry 46. To do so, the operator 24 may approach the electrical protection circuitry 46 and read a status on the front of the load to glean information about an operation of the industrial automation system 10. However, the information and/or statuses for various components disposed on the electrical circuitry housing 48 may not be visible by the operator 24. Thus, in some cases, the operator 24 may verify a status or operation of a load of the electrical protection circuitry 46 at least in part by opening the electrical protection circuitry 46 and using tools to sense one or more parameters for verifying the status or operation of the load.

With this in mind, the operator 24 may better perform his or her tasks while verifying operating parameters of components inside the electrical circuitry housing 48 using the embodiments described below. For example, control and automation operations may improve if the electrical protection circuitry 46 were associated with a status indicator disposed external to or on the electrical circuitry housing 48. When disposed external to or on the electrical circuitry housing 48, the operator 24 may verify an operation of the electrical protection circuitry 46 without opening the electrical circuitry housing 48. A status indicator light may receive power from a power supply 54 (e.g., electrical supply circuitry) disposed within electrical circuitry housing 48 or otherwise associated with the electrical protection circuitry 46.

Figure 4:
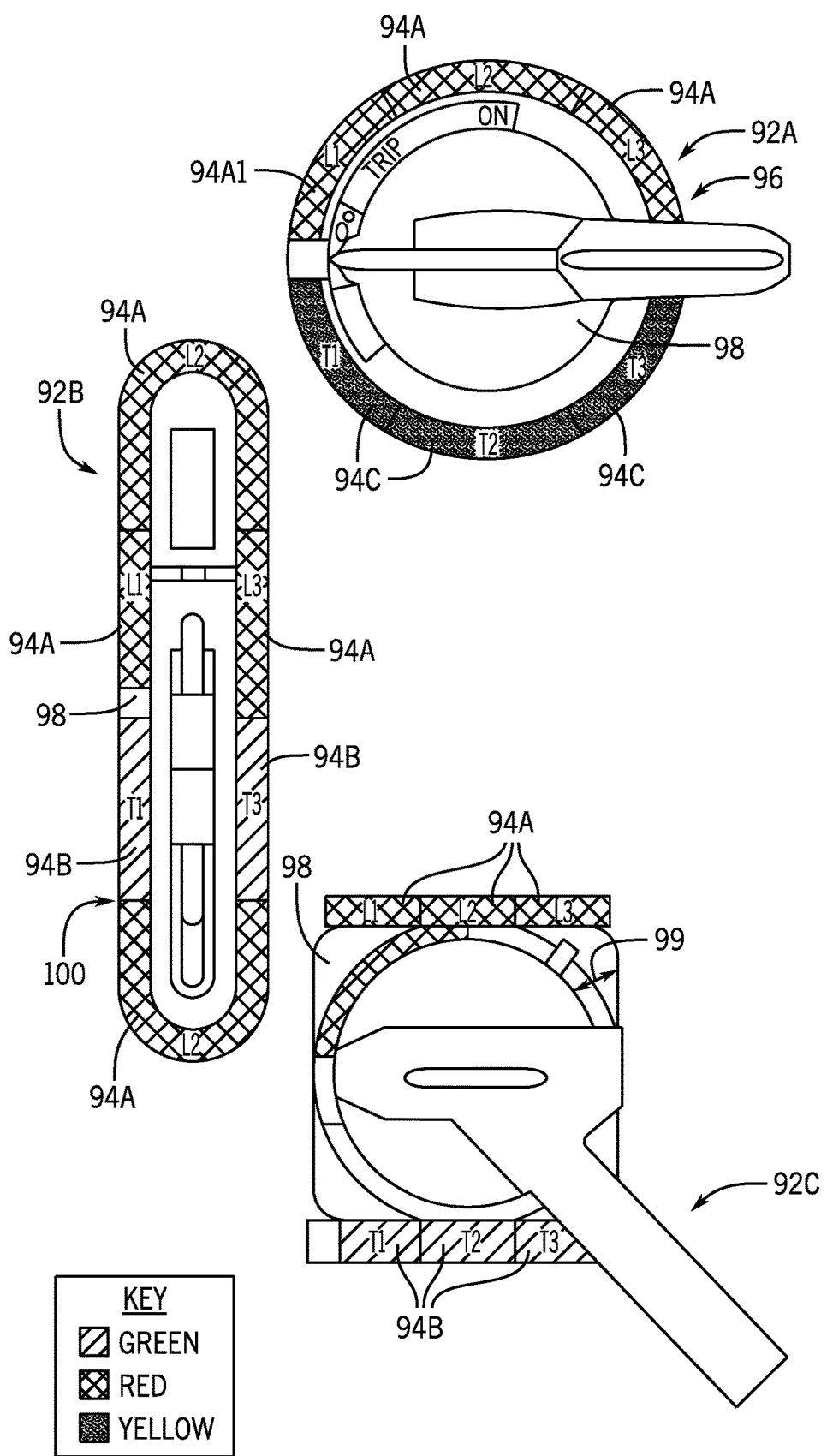
FIG. 4 is an illustration of example handles of electrical protection circuitry housing of electrical protection circuitry of the industrial control system of FIG. 2, in accordance with an embodiment.

By way of example, the embodiments described herein may include incorporating light indicators to handles used to operate components disposed in the electrical circuitry housing 48, access the electrical circuitry housing 48, operate components electrically connected to the industrial automation system 10, and the like. To elaborate, FIG. 4 is an illustration of example handles 92 (92A, 92B, 92C) that may be disposed on the electrical circuitry housing 48. The electrical circuitry housing 48 may include components stored therein that couple and/or interface with a variety of handles 92 (e.g., handles with different geometries or shapes). The handles 92 may be disposed on an outer surface (e.g., outer face) of the electrical circuitry housing 48. Each handle 92 may be associated with visual status indicators 94 to improve control operations of the industrial automation system 10. Each status indicator 94 may correspond to an indication related to a current operation of the electrical protection circuitry 46 and/or one or more phases monitored via the electrical protection circuitry 46. In this example, the status indicators 94 correspond to individual phases monitored. For example, a status indicator 94A1 emitting red light may correspond to a first supply line (L1) out of three supply lines (L1, L2, L3). Similarly, a status indicator 94B1 emitting green light may correspond to a first load line (T1) out of three load lines (T1, T2, T3).

A first handle 92A may include the status indicators 94 as a concentric ring 96 around a base 98 of the first handle 92A. For example, the base 98 of the handle 92A may be disposed on the a cutout in the electrical circuitry housing 48 such that at least some of a locking mechanism of the handle 92A may fit through the cutout without the entity of the base 98 fitting through the cutout. The cutout may be of any suitable diameter and the base 98 may be scaled to fit at least over the cutout. For example, when the cutout is 35 millimeters (mm) in diameter, the base 98 may have a diameter larger than the 35 mm diameter, such as a 70 mm to 80 mm diameter (e.g., 76.7 mm). Sometimes a base 98 may be a rectangle or a square, in this way a diagonal measurement of the base 98 may be larger than a diameter of the cutout beneath the base 98.

The status indicators 94 may be disposed around the handle 92A such that a circumference of the handle 92A is disposed adjacent to an edge of the status indicator 94. The status indicators 94 may be disposed on a base 98. The handle 92A may rotate about an axis central to the base 98 of the handle 92A. The status indicators 94 may be disposed within a bezel region 99 of the base 98. In some embodiments, the status indicators 94 may be disposed at least partially between the base 98 and an outer surface of the electrical circuitry housing 48 when the handle is positioned on an opening of the electrical circuitry housing 48.

A second handle 92B may include the status indicators 94 as a concentric oval 100 around the base 98 of the second handle 92B. A third handle 92C may include the status indicators at the base 98 of the third handle 92C but not as a concentric oval or circle around the base 98. Each of the status indicators 94 may be a single independent light source (e.g., a light bulb, a light emitting diode) or a segmented light source (e.g., a portion of a strip of light emitting diodes).

Light emitted by the status indicators 94 may change in response to operations of the industrial control system 12 as a way to provide a visual indication of an operation status to an operator. The control system 44 may determine the operation status of the electrical protection circuitry 46 is and use the determined operation status to change output of the status indicators 94. For example, the control system 44 may determine whether the electrical protection circuitry 46 is "on" or is in an electrically decoupled operational state, is "off" or is in an electrically decoupled operational state, or is in a "trip," state where the electrical protection circuitry 46 has opened or at least partially decoupled from the power supply 54 but not necessarily while expecting to do so. The light emitted by the status indicators 94 may change to match a color, lighting pattern, or some other visual output to correspond to an actual operational state of the electrical protection circuitry 46, such as whether the electrical protection circuitry 46 is receiving power from the power supply 54, whether the electrical protection circuitry 46 is outputting power from the power supply 54, or the like.

By way of example, the status indicators 94 may change color in response to a current operating condition of the electrical protection circuitry 46. For example, a red status indicator 94A may correspond to a "hot" or electrically coupled connection of at least a portion of the electrical protection circuitry 46, a summary green status indicator 94B may correspond to an "off" or electrically decoupled connection of at least a portion of the electrical protection circuitry 46, and a yellow status indicator 94C may correspond to a "trip" state or an electrically decoupled connection of at least a portion of the electrical protection circuitry 46 that decoupled in response to an undesired operation of the components within the electrical circuitry hosing 48, a detection of a fault within the industrial automation system 10, or the like. The control system 44 may determine a current operation of the components within the electrical circuitry housing 48 by polling one or more sensing devices. Examples of sensing devices may include relays, potential-sensing transformers, current-sensing transformers, or the like. In some cases, a mechanical switch and a switch state detector, may be included as part of the electrical protection circuitry 46 to detect one or more operational states of the electrical protection circuitry 46, such as whether an incoming bus line is coupled to an electrical source, whether an outgoing bus line is electrically coupled to an electrical source, or the like.

The base 98 of each of the handles 92 may couple through a front surface (e.g., front door) of the electrical circuitry housing 48 and, in some embodiments, with the electrical protection circuitry 46. The base 98 of the handle 92 may mechanically couple the handle 92 to the electrical circuitry housing 48 such that the handle 92 may rotate along one axis without rotating along another axis. As a position of the handle 92 changes, positions of circuitry and/or hardware internal to the connected components within the electrical circuitry housing 48 may change as well. For example, the position of the handle 92 may be used to reset a circuit breaker after an electrical trip operation. In this way, additional protective operations may include verifying that a position of the handle 92 matches an expected position of the handle 92 based on current operating conditions of the respective components (e.g., electrical protection circuitry 46) within the electrical circuitry housing 48.

Figure 5:
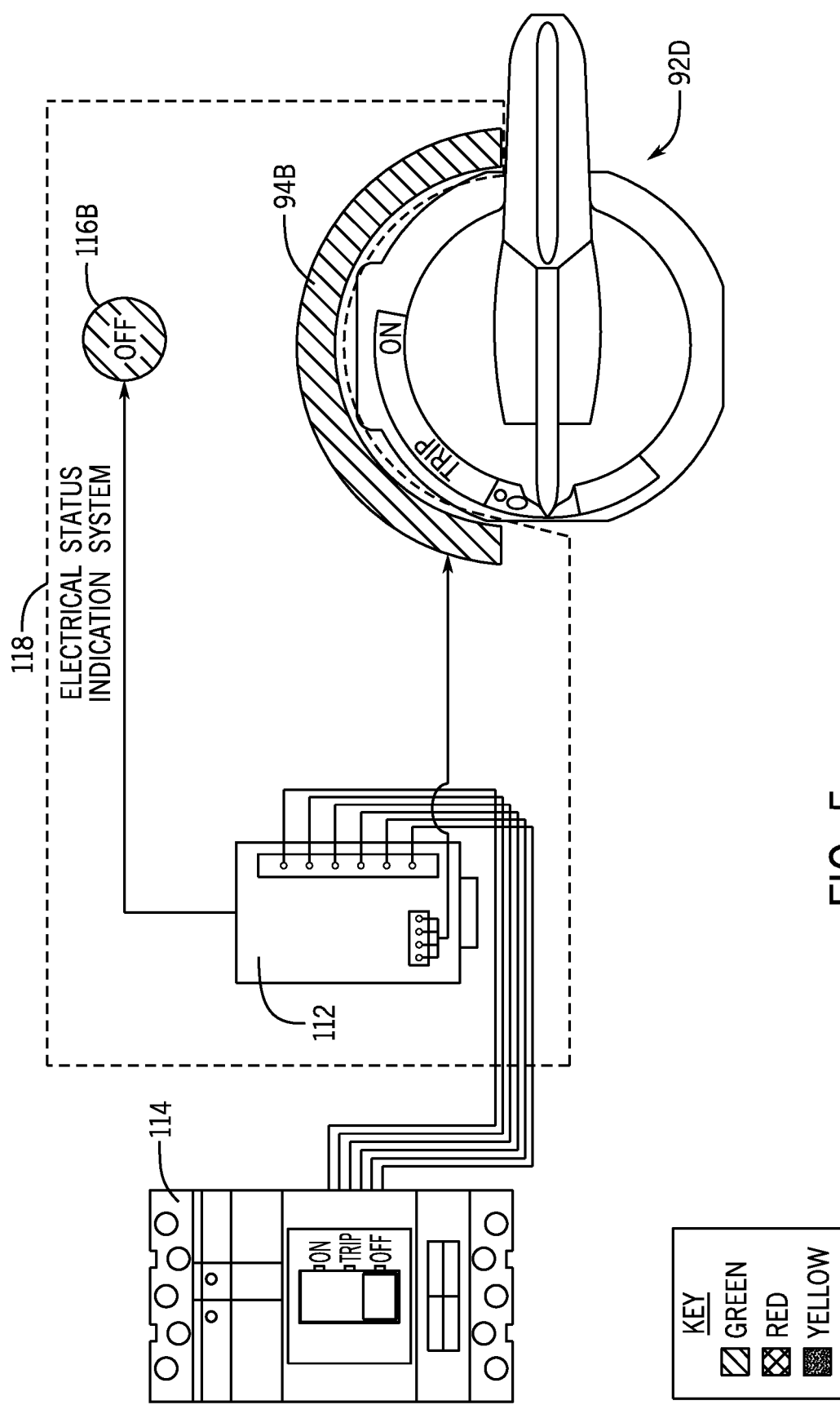
FIG. 5 is an illustration of a first example handle of the electrical protection circuitry housing of the industrial control system of FIG. 2, in accordance with an embodiment.

To help explain particular operation of the handles 92 and the status indicators 94, FIG. 5 illustrates an example of the handle 92D associated with a status indicator 94 coupled to a relay 112 that is coupled to a circuit breaker 114. The status indicator 94 is disposed in such a way that half a circumference of the handle 92D is disposed adjacent to an edge of the status indicator 94. The handle 92D may also correspond to an additional status indicator 116B that also shows a status of the respective components and is shown as emitting green light.

In this example, the circuit breaker 114 is off and the handle 92D is in the off position. Furthermore, the relay 112 may sense whether the load of the circuit breaker 114 is coupled to the power supply 54. When the load is not coupled to the power supply 54, an output from the relay 112 indicates that an electrical coupling between an input into the circuit breaker 114 and an output from the circuit breaker 114 is electrically decoupled. This output may drive the status indicator 94B to emit a green light.

An electrical status indicator system 118 may include the status indicators 94, the additional status indicator 116, and the relay 112. The electrical status indicator system 118 may be installed at a time of installation of the electrical circuitry housing 48 or may be installed as a retrofit on a pre-installed electrical circuitry housing 48. In either case, electrical couplings between the relay 112 and the status indicator 94 may be threaded between a surface of the base 98 of the handle 92D and a surface of the electrical circuitry housing 48 or an opening of the electrical circuitry housing 48 that the base 98 is disposed on. The relay 112 may receive electrical power via a voltage tap electrically coupling the relay 112 to the circuit breaker 114 and/or the relay 112 may maintain a local electrical power source (e.g., battery).

Figure 6:
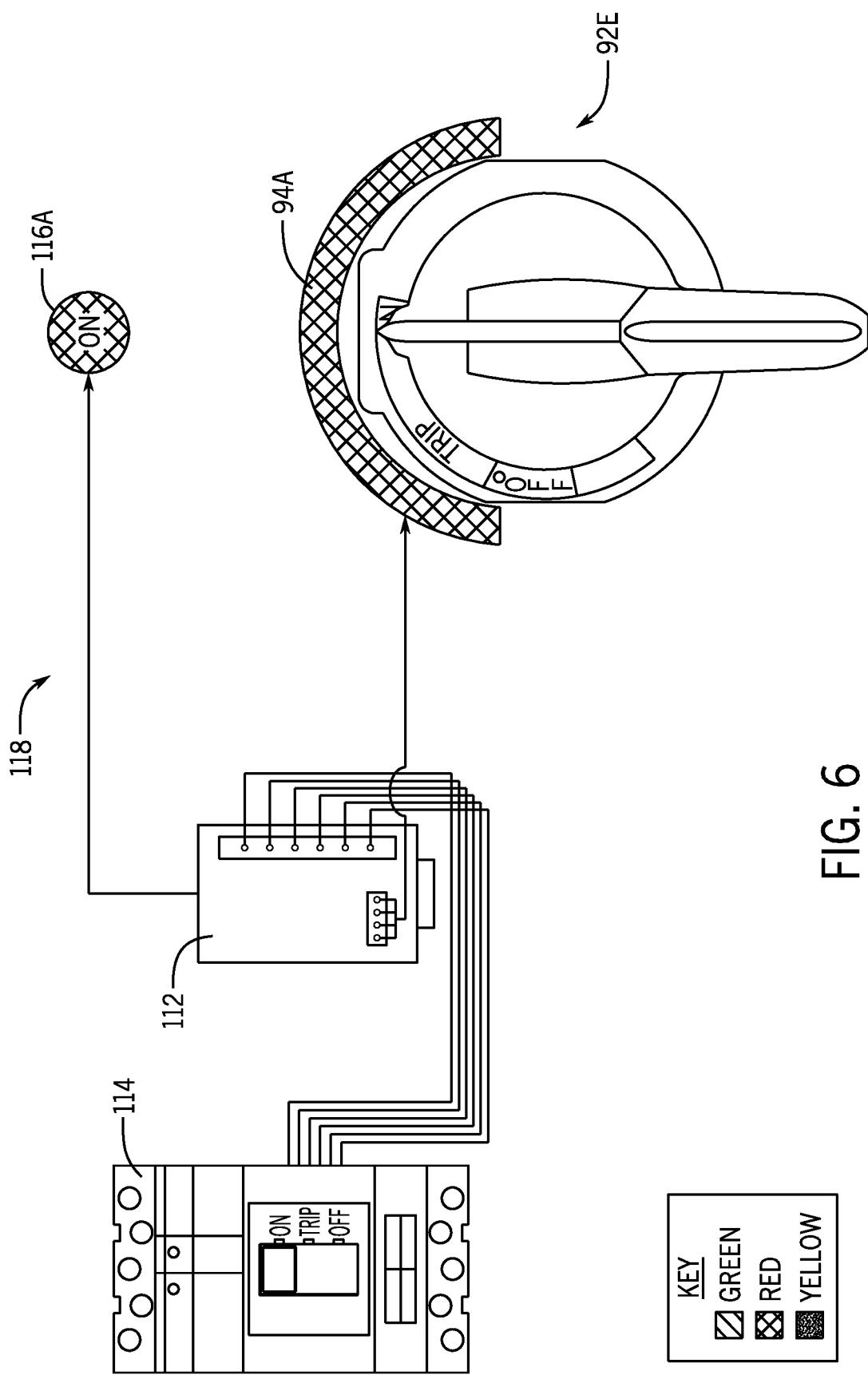
FIG. 6 is an illustration of a second example handle of the electrical protection circuitry housing of the industrial control system of FIG. 2, in accordance with an embodiment.

The relay 112 may perform monitoring operations and communicate with sensors 18. When the relay 112 senses that electricity is provided to a load of the circuit breaker 114 and thus the circuit breaker 114 is operated "on," (e.g., closed) the status indicator 94 may emit red light, such as to indicate that there is electricity powering a load of the circuit breaker 114. FIG. 6 illustrates an example of the handle 92E and the status indicator 94A (e.g., status indicator 94 emitting red light) indicating to an operator 24 that the circuit breaker 114 is "on." When the circuit breaker 114 is on, the input to and an output from the circuit breaker 114, and thus the load, are electrically coupled to the power supply 54. Furthermore, a position of the circuit breaker 114 has also changed (e.g., FIG. 6 depicts the circuit breaker 114 in the "on" position) and the handle 92E is in an "on" position.

Figure 7:
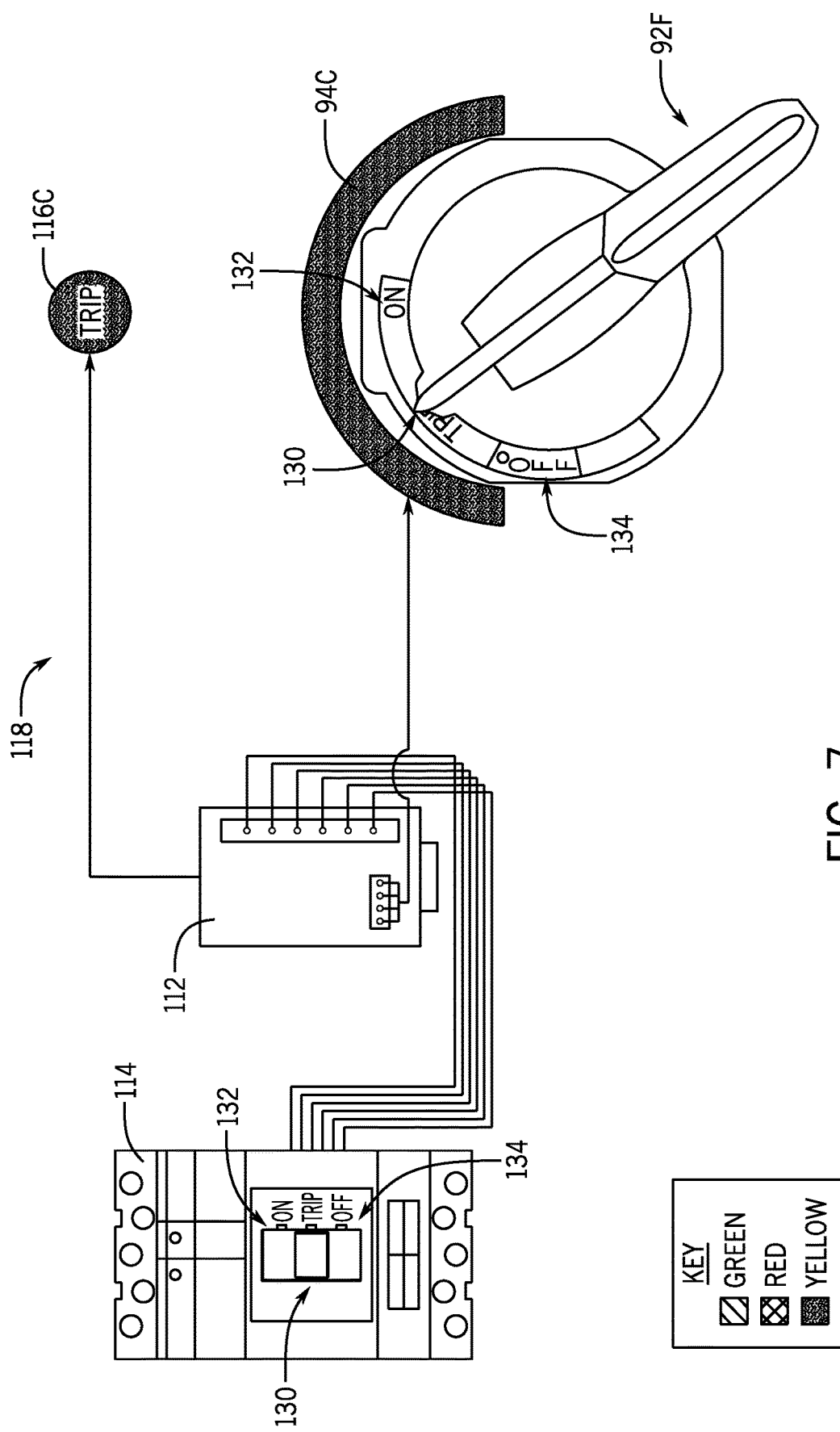
FIG. 7 is an illustration of a third example handle of the electrical protection circuitry housing of the industrial control system of FIG. 2, in accordance with an embodiment.

FIG. 7 illustrates an example of the handle 92F in a "trip" position. In an industrial context, the "trip" position refers an automatic position that a handle of the electrical protection circuitry 46 rotates into in response to detecting a trip condition or fault. In response to detecting the trip condition or fault, the electrical protection circuitry 46 electrically isolates the load side from the supply side and may stop damage from occurring to components electrically coupled via the electrical protection circuitry 46. Thus, in response to a trip operation, for example, the circuit breaker 114 may maintain a particular "trip" position 130 until an operator manually resets the circuit breaker 114. The "trip" position 130 may be between an "on" position 132 and an "off" position 134. In a similar way, the handle 92F may have a particular trip position between an orientation of the "on" position 132 and the "off" position 134. When the relay 112 verifies that the circuit breaker 114 is physically and electrically in the "trip" position 130, the relay 112 may transmit a control signal to the status indicator 94 to cause the status indicator 94C to emit a yellow light. It is noted that although "on," "off," and "trip" operations are described as corresponding respectively to red light emission, green light emission, and yellow light emission, this is merely for ease of discussion. Thus, any suitable format of light emission may correspond to various statuses of the electrical protection circuitry 46.

Figure 8:
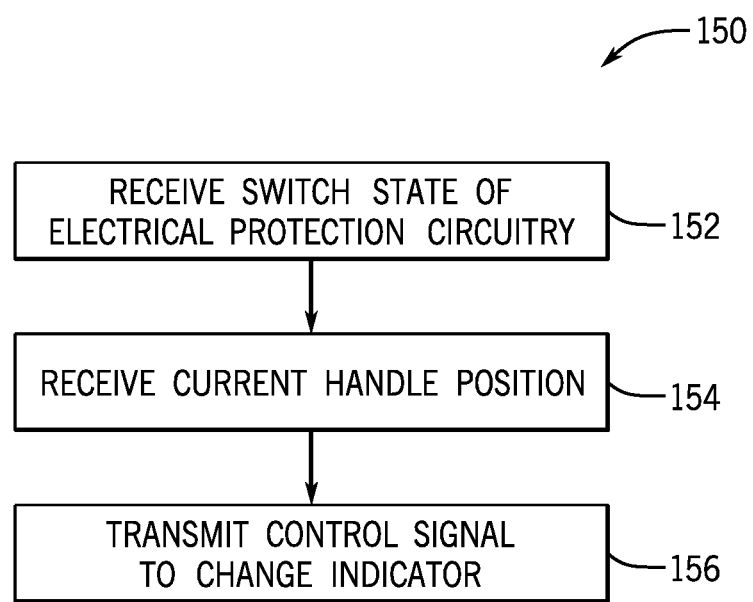
FIG. 8 is a flowchart of a method for operating the handle of the electrical protection circuitry housing of the industrial control system of FIG. 2 to communicate a status of the electrical protection circuitry, in accordance with an embodiment.

To help summarize the operation of the relay 112, FIG. 8 is a flowchart of a method 150 for operating the handle 92 to communicate a status of the component within the electrical circuitry housing 48. Although the method 150 is described as being performed by the control system 44, it should be understood that the method 150 may be performed by any suitable component of the industrial automation system 10. For example, the computing device 42, the control system 44, the motor drive 40, or any suitable processing circuitry may perform some or all of the method 150. Furthermore, the control system 44 may be external to the electrical circuitry housing 48 and/or may be internal to the electrical circuitry housing 48, such as included within or associated with the relay 112.

Referring now to the method 150, at block 152, the control system 44 may receive a switch state of the electrical protection circuitry 46. The control system 44 may determine whether a switch of the electrical protection circuitry 46 is closed by interpreting the switch state. The switch state may include an indication of whether the respective component is on (e.g., switched closed, electrically energized), off (e.g., switched open), or tripped (e.g., unexpectedly switched open, operated open as part of a monitoring operation). As mentioned above, the components may include the electrical protection circuitry 46, such as the circuit breaker 114. In this way, a switch state of the circuit breaker 114 may correspond to a determination of where the switch of the circuit breaker 114 is physically positioned (e.g., position 130, position 132, or position 134). The switch state of the respective component may be determined and/or verified by using one or more voltage or electrical parameter measurements to determine whether a supply side and/or a load side of the circuit breaker 114 is electrically coupled to its load. In some cases, instead of the switch state, the supply side and/or the load side of the circuit breaker 114 may be verified as energized to determine the operational status, the supply side status, the load side status, or the like of the circuit breaker 114. To perform the sensing, the control system 44 may test a voltage sensing device against a known voltage, such as a power supply or stable reference voltage, and verify that the voltage sensing device is operating suitably. Once verified, the control system 44 may sense via the sensing device a voltage of the supply side and/or the load side. In some cases, the control system 44 may verify again that voltage sensing device is operating suitably before trusting the sensed voltage of the supply side and/or the load side, in accordance with some lockout-tag out procedures.

At block 154, the control system 44 may receive a current handle position. The current handle position corresponds to a location that the handle 92 is physically positioned (e.g., position 130, position 132, or position 134). Comparing the handle 92 position to the switch state of the electrical protection circuitry 46 may help the control system 44 identify mismatching positioning. Mismatching positions may occur when one or more switch states and/or operational statuses of the electrical protection circuitry 46 do not match the current handle position and may indicate a technical issue or otherwise indicate that a mechanical inspection is to be performed.

At block 156, the control system 44 may transmit a control signal to change one or more status indicators 94. The control system 44 may generate the control signal in response to comparing the current handle position and the current switch state to a look-up table defining input-output relationships. The combination of the current handle position and the current switch state may indicate an operational status of the electrical protection circuitry 46. For example, the control system 44 may determine that the supply side of the electrical protection circuitry 46 and the load side of the electrical protection circuitry 46 are on and electrically coupled to the power supply, but the current handle position is off (e.g., position 134). This combination of statuses may indicate that an abnormal operation of the electrical protection circuitry 46 is ongoing.

Figure 9:
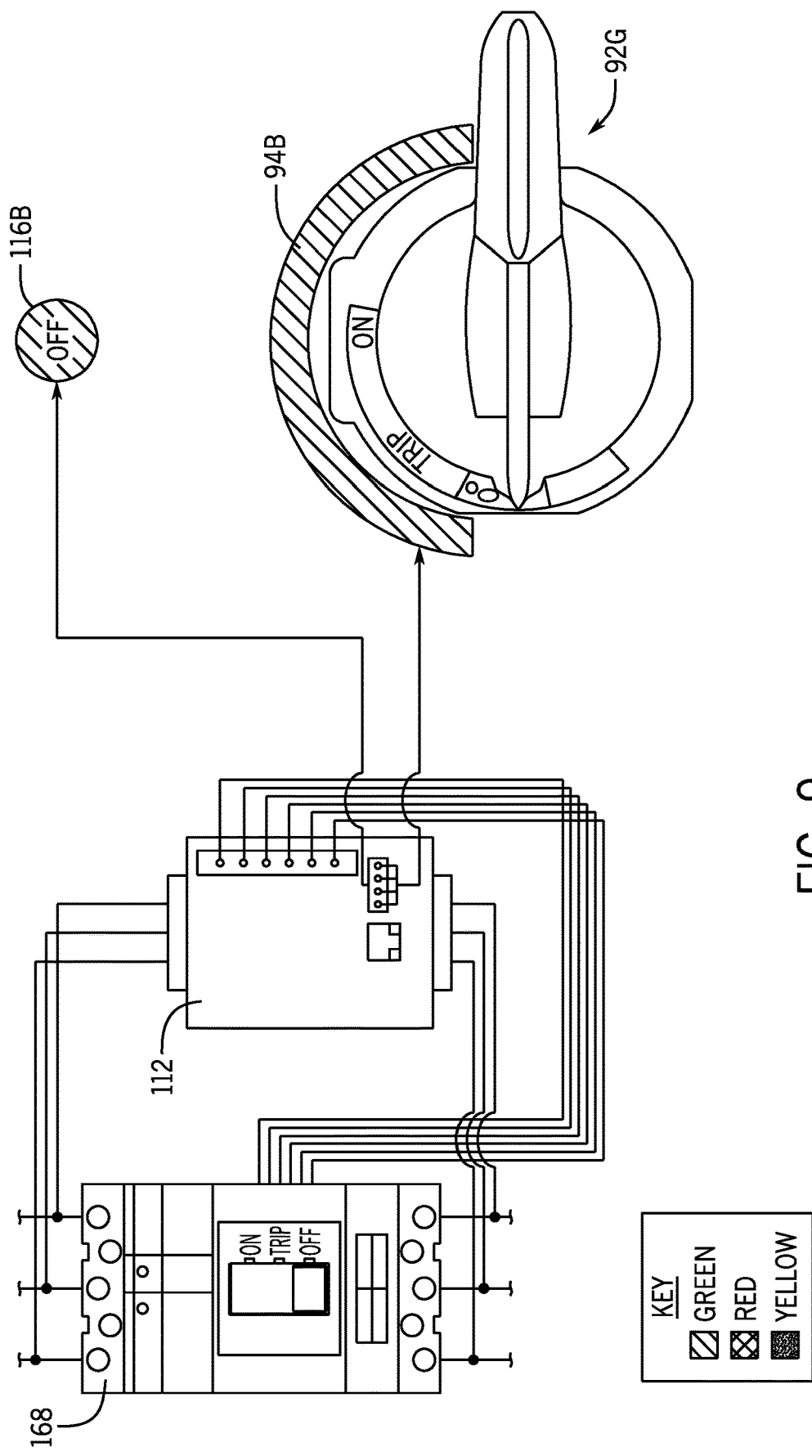
FIG. 9 is an illustration of a fourth example handle of the electrical protection circuitry housing of the industrial control system of FIG. 2, in accordance with an embodiment.

In the examples of FIG. 5, FIG. 6, and FIG. 7, the handles 92D, 92E, 92F, each have a single light indicator that is used to indicate a status for the operation of the circuit breaker 114 as a whole (e.g., whether the circuit breaker 114 is on, off, or tripped). FIG. 9 illustrates another example of a handle 92G in an off position. The handle 92G is similar to the handle 92D. However, unlike FIG. 4, FIG. 9 shows the handle 92G coupled to a three-phase circuit breaker 168. In this example, the status indicator 94B displays a status indicative of an operation of the three-phase circuit breaker 168. Thus, if the three-phase circuit breaker 168 was closed, the status indicator 94 may display an on indication and be emitting red light. Since the three-phase circuit breaker 168 is open, the status indicator 94B displays an off indication and emits green light.

Figure 10:
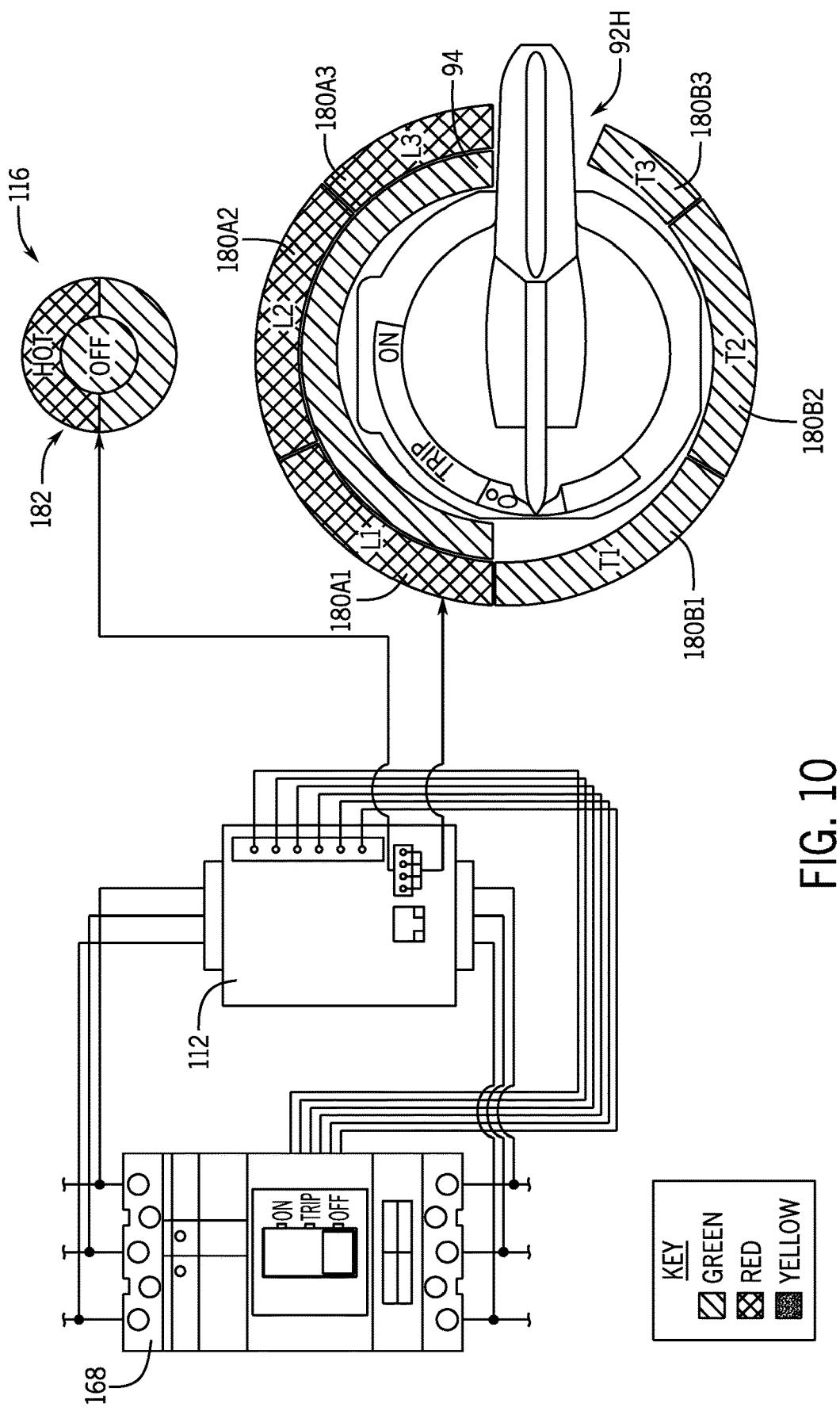
FIG. 10 is an illustration of a fifth example handle of the electrical protection circuitry housing of the industrial control system of FIG. 2, in accordance with an embodiment.

FIG. 10 illustrates yet another embodiment where a handle 92H includes individual phase status indicators 180 (180A1, 180A2, 180A3, 180B1, 180B2, 180B3). Each phase of the three-phase circuit breaker 168 (e.g., L1, L2, L3, T1, T2, T3) may correspond to a corresponding operational status (e.g., electrically decoupled, electrically coupled). Each individual phase status indicator 180 corresponds to a status of each phase of the three-phase circuit breaker 168. Furthermore, the status indicator 94 may describe the status indicative of the operation of the three-phase circuit breaker 168. This may be a similar status indicator to the phase status indicator 180B of the handle 92G. In this way, when the three-phase circuit breaker 168 is in an off state, the status indicator 94 may emit a green light. The status indicator 94 may emit light and/or may convey a status independent of status communicated or light emitted via the individual phase status indicator 180. The additional status indicator 182 also indicates the operational statuses of the three-phase circuit breaker 168. The handle 92H may indicate an expected and/or normal operation because when the three-phase circuit breaker 168 is operated open (e.g., off), a supply side may be expected receive electrical waveforms, while a load side may be expected to be electrically decoupled from the supply side.

Figure 11:
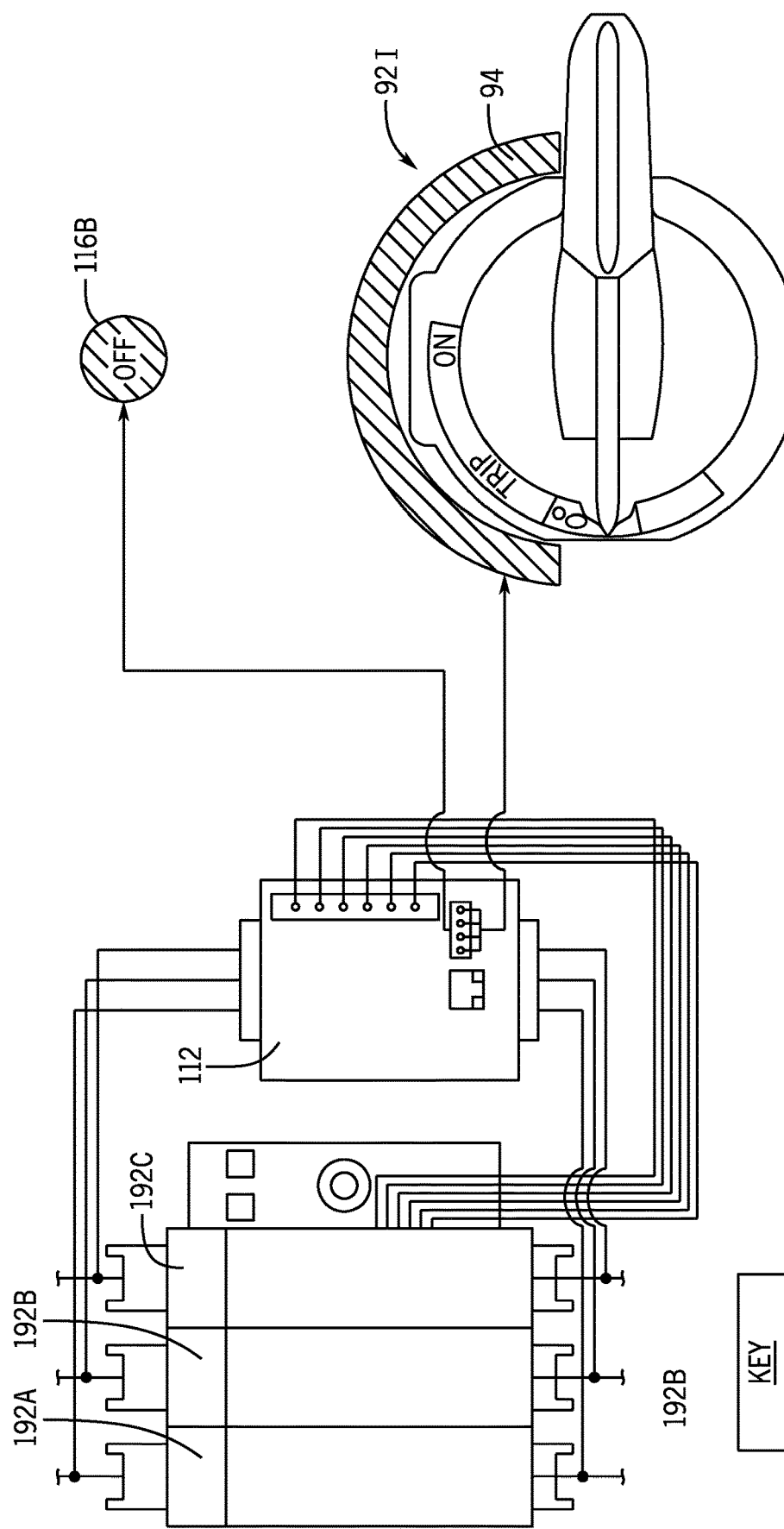
FIG. 11 is an illustration of a sixth example handle of the electrical protection circuitry housing of the industrial control system of FIG. 2, in accordance with an embodiment.

FIG. 11 illustrates yet another embodiment where a handle 92I includes a status indicator 94. The handle 92I is similar to the handle 92H from FIG. 7, the handle 92I corresponds to and operation of three-phase circuit breakers 192 (192A, 192B, 192C) that may include an individual breaker for each phase incoming into the three-phase circuit breakers 192. The status indicator 94 may represent an operational status of a collective operation of the three-phase circuit breakers 192. In this way, the status indicator 94 may represent whether, as a whole, the three-phase circuit breakers 192 are operated open or closed. As depicted, when the three-phase circuit breakers 192 are operated open, the status indicator 94 and the additional status indicator 116B may emit green light as part of indicating an off status (e.g., electrically decoupled).

Figure 12:
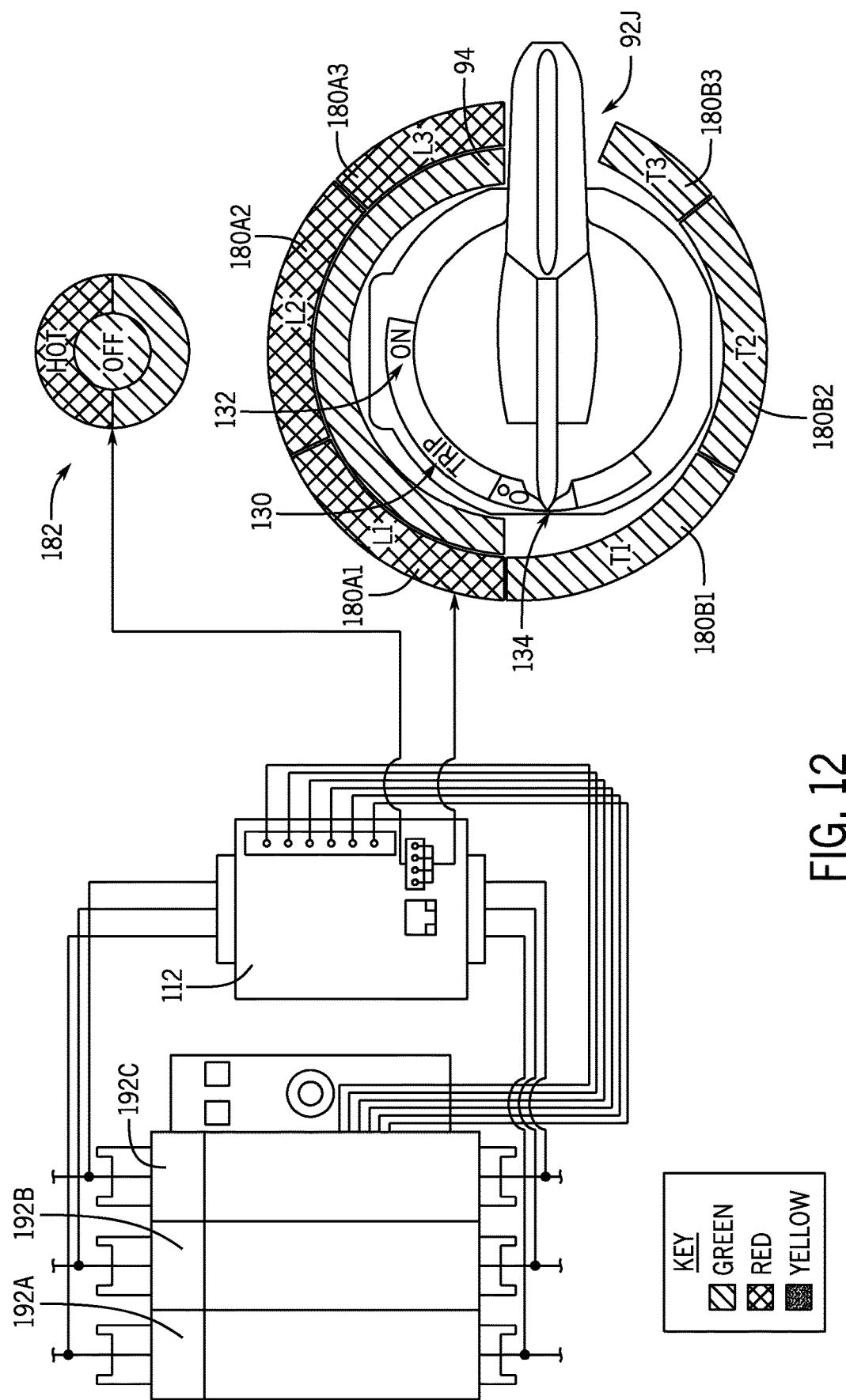
FIG. 12 is an illustration of a seventh example handle of the electrical protection circuitry housing of the industrial control system of FIG. 2, in accordance with an embodiment.

FIG. 12 illustrates an example of a handle 92J that may include the handle 92I and the individual phase status indicator 180 described in FIG. 10. The handle 92J may indicate an expected and/or normal operation. For example, the handle 92J is positioned at position 134 (e.g., "off") and the individual phase status indicators 180 corresponding to a supply side of the three-phase circuit breaker 192 (e.g., phase status indicator 180A1, phase status indicator 180A2, phase status indicator 180A3) emit a red light to indicate that the load side of the electrical protection circuitry 46 is electrically coupled to the power supply 54. The supply side phase status indicators 180 may emit red while load side phase status indicators 180 (e.g., phase status indicator 180B1, phase status indicator 180B2, phase status indicator 180B3) each emit a green light to indicate that the load side of the electrical protection circuitry 46 is "off" or electrically decoupled from the power supply 54. When the three-phase circuit breakers 192 operate closed and electrically couple a load side to a supply side, the handle 92J may change position.

Figure 13:
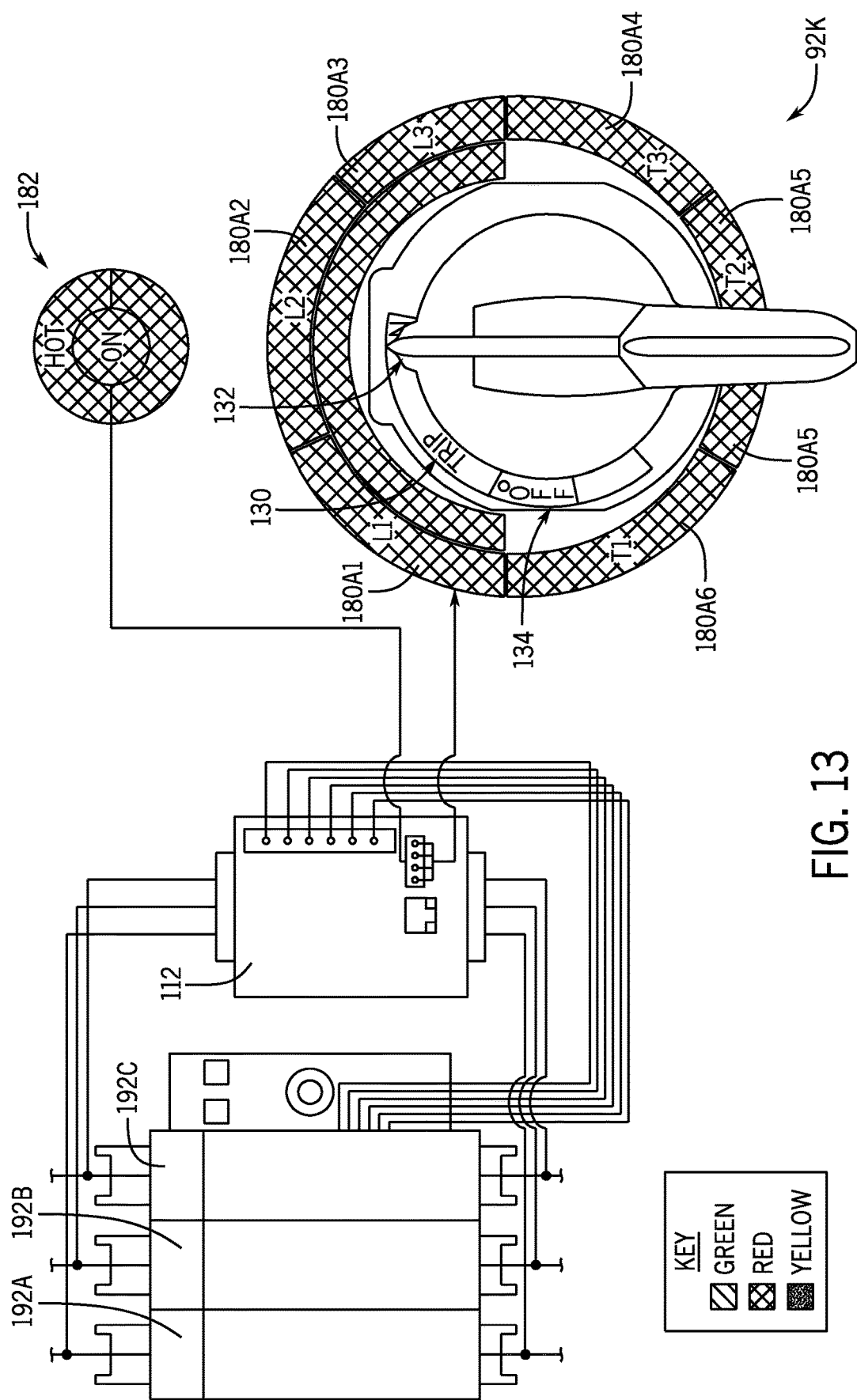
FIG. 13 is an illustration of an eighth example handle of the electrical protection circuitry housing of the industrial control system of FIG. 2, in accordance with an embodiment.

For example, the handle 92J may change from the "off" position 134 to the "on" position 132. FIG. 13 illustrates an example of a handle 92K in the "on" position 132. The handle 92K may communicate a status corresponding to the three-phase circuit breakers 192 to the control system 44. In this example, the handle 92K is in the position 132 (e.g., an "on" position 132) to indicate to the operator 24 that the three-phase circuit breakers 192 are electrically coupled to the power supply 54. Each of the status indicators 94, the individual phase status indicators 180, and the additional status indicator 182 communicate via the light emitted that the three-phase circuit breakers 192 are electrically coupled to a power source and thereby in an on state. For example, each of the individual phase status indicators 180 (180A1, 180A2, 180A3, 180A4, 180A5, 180A6) may emit a red light to visually indicate that the electrical protection circuitry 46 is electrically coupled to the power supply 54. In this way, the operator 24 may detect a status of the component (e.g., electrical protection circuitry 46) from a desirable distance (e.g., visible to light indicator) away from the component.

As described above, the relay 112 (e.g., a control system 44) may use a switch state and a current handle position to determine how to drive the status indicator 94 to emit light. The relay 112 may additionally or alternatively use additional information, such as individual line side status, load side status, and/or additional sensing information to determine a manner in which to drive the status indicator 94 to emit light. This comparison and/or monitoring operations may be performed by any suitable control system 44 of the industrial control system.

Figure 14:
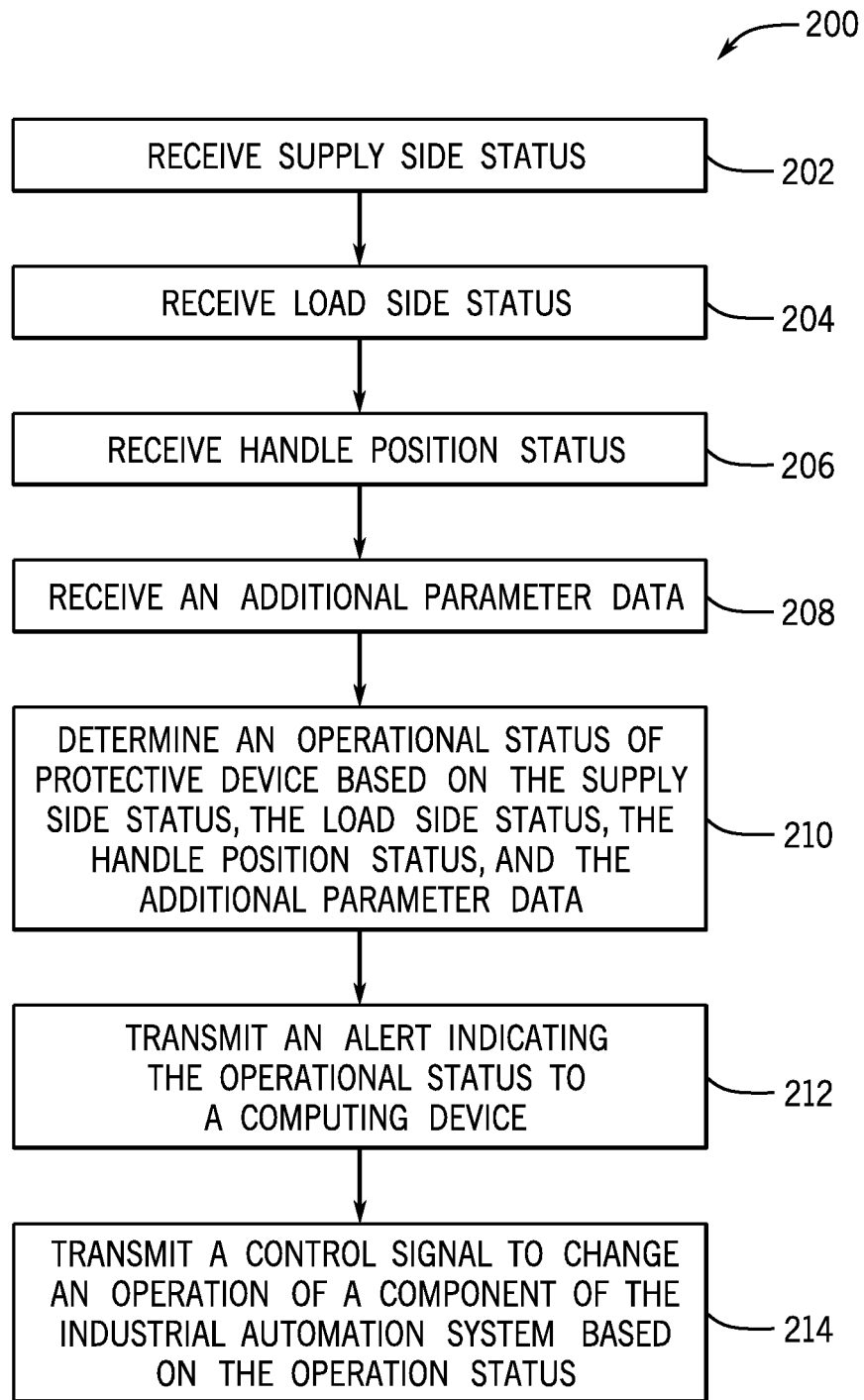
FIG. 14 is a flowchart of a method for operating the handle of the electrical protection circuitry housing of the industrial control system of FIG. 2 to determine a status of the electrical protection circuitry, in accordance with an embodiment.

For example, FIG. 14 is a flowchart of a method 200 for operating the handle 92 to communicate a status of the components stored within or accessible via the electrical circuitry housing 48. Although the method 200 is described as being performed by the control system 44, it should be understood that the method 200 may be performed by any suitable component of the industrial automation system 10. For example, the relay 112, the computing device 42, the motor drive 40, and/or any suitable processing circuitry may perform some or all of the method 200. Furthermore, some of the operations of the method 200 may be performed in any suitable order.

At block 202, the control system 44 may receive a supply side status. The control system 44 may receive the supply side status from a sensing device and/or relay similar to the relay 112. The supply side status may indicate whether the supply side (e.g., line side) of the electrical protection circuitry 46 is electrically coupled to the power supply 54 or is electrically decoupled to the power supply 54. This may be sensed by detection of electrical waveforms upstream from the electrical protection circuitry 46, such as by a potential-sensing transformer or other sensing device.

Similarly, at block 204, the control system 44 may receive a load side status. The control system 44 may receive a load side status from the sensing device and/or relay similar to the relay 112. The load side status may indicate whether the load side of the electrical protection circuitry 46 is electrically coupled to the power supply 54. The load side status during normal operation or an expected operation may match an operational status of the electrical protection circuitry 46. For example, when the electrical protection circuitry 46 is open, and thus is in an off operation, the load line status may also be considered electrically decoupled (e.g., off).

At block 206, the control system 44 may receive an indication of a position of the handle 92, such as the "trip" position 130, "on" position 132, or "off" position 134. The handle 92, at each of these positions 130, 132, 134 may couple to various electromechanical contacts, such that when the handle 92 is moved into the position 130, 132, 134, an electrical path is completed. When the electrical path is completed, a control signal may transmit to the control system 44. The control system 44 may interpret the control signal and/or may determine which electromechanical contact generated the control signal to determine which position the handle 92 was moved into. The position of the handle 92 may be automatically set in response to a change in operation of the electrical protection circuitry 46. For example, the electrical protection circuitry 46 may trip and cause an automatic rotation of the handle 92 into the trip position.

At block 208, the control system 44 may receive additional parameter data. The additional parameter data may supplement information gathered from the handle position status, the supply side status, and the load side status. Examples of the additional parameter data include temperature sensing data, moisture sensing data, audio sensing data, or the like that may be acquired via additional sensors. Additional parameter data may include any detectable or sensible value desirable or otherwise useful for consideration in determining how to perform or adjust an operation within an industrial automation system 10. The control system 44 may use the additional parameter to confirm an operation of the electrical protection circuitry 46. In some cases, the control system 44 may use the additional parameter data to determine whether a particular combination of parameters and statuses is an expected combination and/or an unexpected combination.

After the control system 44 has received information relating to a current operation of at least a portion of the industrial automation system 10, at block 210, the control system 44 may determine an operational status of the respective component (e.g., electrical protection circuitry 46) based on the supply side status, the load side status, the handle position status, and the additional parameter data. The control system 44 may compare the combination of information to a stored lookup table (e.g., a lookup table stored in the memory 70) to determine the operational status to assign to the combination of information. Table 1 describes example combinations of information and corresponding assignments to operational statuses. Table 1 describes the "Supply Side Status" and the "Load Side Status" in terms of three states (e.g., a combination of off/on, off/on, off/on). Each of the three states corresponds to a respective line for the supply side or load side. In this way, the Table 1 shows the consideration of the control system 44 to the different phases input into the electrical protection circuitry 46. It is noted that in some embodiments, the control system 44 may consider a single phase or a subset of phases input into the electrical protection circuitry 46. Furthermore, in some embodiments, the control system 44 may consider one phase for the supply side of the electrical protection circuitry 46, three phases for the load side of the electrical protection circuitry 46, or vice versa. In this way, the control system 44 may consider one or more phases for the supply side independent of the number of phases considered for the load side of the electrical protection circuitry 46.

TABLE 1

| Supply Side Status | Load Side Status | Handle Position Status | Additional Parameter Data | Operational Status | Recommendation |
| --- | --- | --- | --- | --- | --- |
| On, On, On | On, On, On | Off | N/A | Abnormal Operation | Personal protective equipment (PPE) Required |
| On, On, On | Off, Off, Off | Off | N/A | Normal Operation | Safe to Access |

TABLE 1-continued

| Supply Side Status | Load Side Status | Handle Position Status | Additional Parameter Data | Operational Status | Recommendation |
|---|---|---|---|---|---|
| On, On, On | Off, Off, Off | Off | High Temperature | Abnormal Operation | PPE Required; High Cabinet Temperature |
| On, On, On | Off, On, On | On | High Change in Temperature of Terminals | Abnormal Operation | Blown fuse likely |

When the control system 44 receives the information from various sensors of the industrial automation system 10, the information may be used to determine an operational status of the electrical protection circuitry 46 and/or to determine a recommendation. The recommendation provides a recommended action, recommended response, a root-cause prediction for a particular operation, permission to egress (e.g., "Safe to Access" recommendation), or the like. The recommendation may provide insight into the operational status for the benefit of the operator 24.

In some embodiments, the recommendation and/or the operational status may be interpretable and received by one or more components of the industrial control system 12, such as when transmitted as an alert. At block 212, the control system 44 may transmit an alert including the recommendation and/or operational status to one or more computing devices 42. The alert may be used to perform one or more additional operations or adjustments to components or equipment in the industrial automation system 10. The control system 44, leveraging the communication network 50 of the industrial control system 12, may transmit the recommendation and/or the operational status for review and/or use by other components of the industrial control system 12. An alert may be generated to communicate the recommendation and/or the operational status. The alert may be transmitted to the operator 24 via a push notification, such as to a computing device 42 (e.g., laptop, cellular device), via a text message (e.g., Short Message Service (SMS), Rich Message Service (RMS), Multimedia Message Service (MMS)), via an Electronic mail (E-mail) or the like to the operator 24.

At block 214, the control system 44 may transmit a control signal to change an operation of a component of the industrial automation system 10 based on the operational status. For example, the control system 44 may determine and transmit a control signal to the status indicator 94, the individual phase status indicators 180, the additional status indicator 116, or the like to visually communicate the operational status via a front or outside surface of the electrical circuitry housing 48. The control system 44 may generate a control signal to transmit to control circuitry for a load electrically coupled to the power supply 54 via the electrical protection circuitry 46. For example, the control system 44 may generate a control signal to change an operation of the motor drive 40 to result in a change in operation to the motor 38.

In some cases, it may be desired to protect which operators 24 are able to adjust operation of the electrical protection circuitry 46. This may be even more of a concern when considering how the handle 92 may be involved in control decisions and/or adjustments applied to the industrial automation system 10 (e.g., through application of method 200). Thus, the handle 92 may include additional authentication systems, such that the control system 44 may perform authentication operations in response to the operator 24 physically rotating or otherwise positioning the handle 92.

Figure 15:
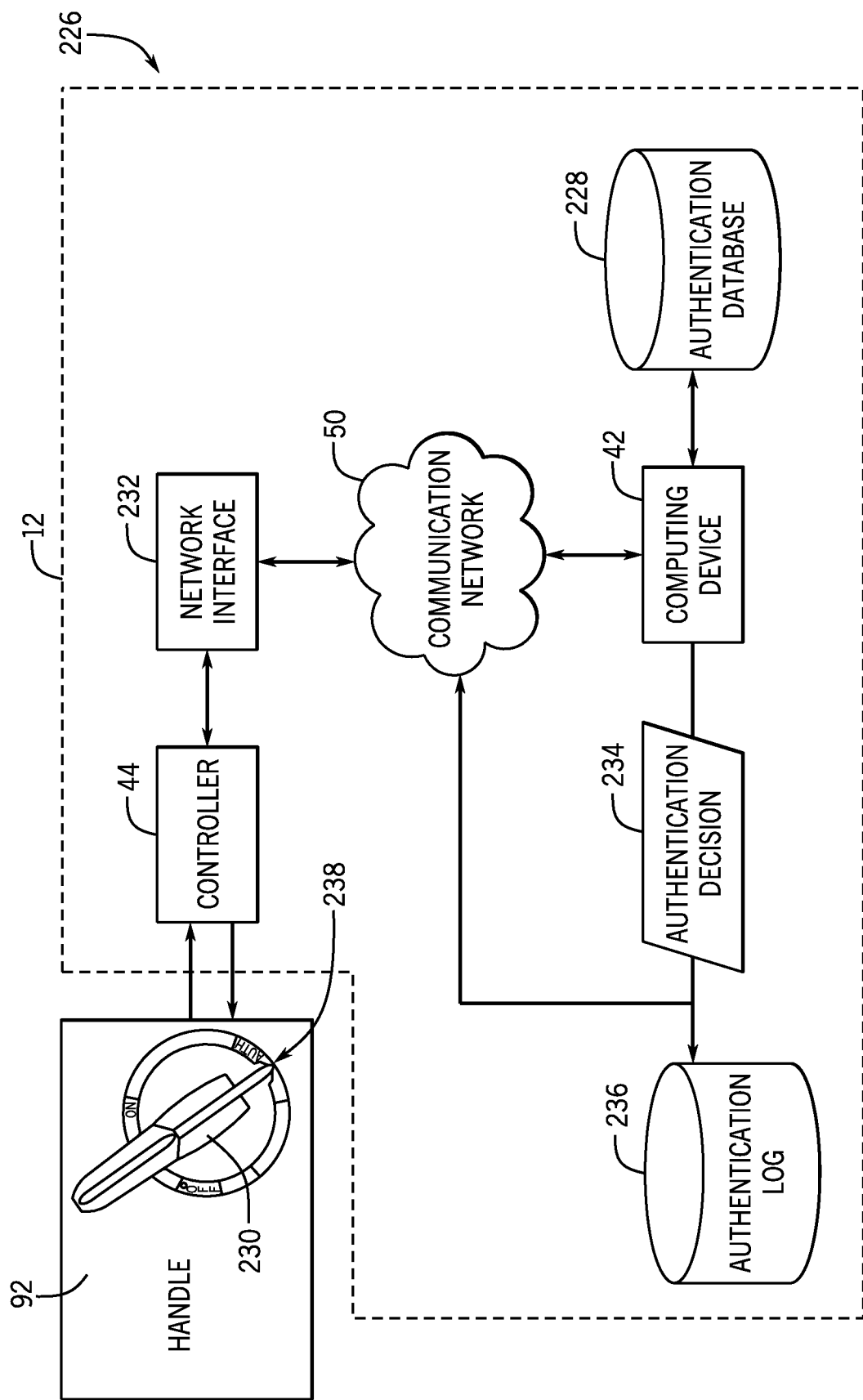
FIG. 15 is a block diagram of an example authentication system that includes a portion of the industrial control system of FIG. 2, in accordance with an embodiment.

FIG. 15 is a block diagram of an example authentication system 226 that includes a portion of the industrial control system 12. The authentication system 226 may include components of the industrial control system 12 and the handle 92. The handle 92 may detect an identity parameter associated with an operator 24 positioning or engaging the handle 92. The handle 92 may transmit the identity parameter for authentication via a computing device 42. The computing device 42 may compare the identity parameter against data stored in an authentication database 228 to determine whether to permit the operator 24 to change a position of the handle 92 (and therefore an operation of the electrical protection circuitry 46).

The handle 92 may be manufactured with or retrofitted with authentication circuitry 230. The sensor data indicative of the identity of the operator may be generated at least in part by the authentication circuitry 230, such as in response to detecting that the operator 24 is engaging with the handle 92. The authentication circuitry 230 may detect an identity parameter associated with the operator 24 and transmit an identity parameter to verify a permission of an operator 24 positioning the handle 92. Fingerprint or biometric detection circuitry may be included within the authentication circuitry 230. In these cases, the identity parameter may include an indication of a fingerprint of the operator 24, or one or more details of the fingerprint of the operator 24. The authentication circuitry 230 may include image and/or audio capturing circuitry to detect a likeness of the operator 24, such as to compare the likeness of the operator 24 against stored images and/or stored audio data to verify whether the operator 24 is authorized to access the electrical protection circuitry 46. The authentication circuitry 230, in some cases, may even include passive radio frequency (RF) detection circuitry to communicate with passive RF tag technology. Each operator 24 may be assigned a RF tag identifier (RFID) that may be stored and used to authenticate an actuation request of the operator 24.

In these cases, the authentication circuitry 230 may transmit the identity parameter to the computing device 42 via the control system 44 and a network interface 232. The network interface 232 may include conversion and/or input/output circuitry that enables the control system 44 to interface with the communication network 50. Although depicted as a wireless network, the communication network 50 may be any combination of a wired network and/or a wireless network. The network interface 232 may include buffer circuitry, clocking circuitry, conversion circuitry, or any suitable circuitry to translate information from a format interpretable by the control system 44 into a format transmittable by the communication network 50.

When the computing device 42 receives the identity parameter, the computing device 42 may query the authentication database 228 to verify whether the identity parameter is stored within the authentication database 228. If a combination of parameters and/or sensed data is gathered as the identity parameter, the computing device 42 may verify the combination of parameters and/or sensed data against one or more stored parameters or sensed data. Information for the operators 24 that have approved access to the electrical protection circuitry 46 may be stored in the authentication database 228. It is noted that an operator 24 may have one permission level for one device of the industrial automation system 10 and a second permission level for another device of the industrial automation system 10. A permission level may determine whether the operator 24 is permitted to access the device of the industrial automation system 10, for example electrical protection circuitry 46. In this way, each identity parameter may be associated with a device identifier in the authentication database 228. The device identifier may be a tag or string of data used to particularly identify one component of the industrial automation system 10 from another. Furthermore, in some embodiments, the operator 24 may have a first permission level for a first operational state of the device but a second permission level for a second operational state. For example, a certain classification of operator 24 may be permitted to access electrical protection circuitry 46 that is operating normally but not ones that operate abnormally, while some classifications of operator 24 may be permitted to access electrical protection circuitry 46 during both normal operation and abnormal operation. For example, an operator 24 may be permitted to shutdown the electrical protection circuitry 46 but may not have an authority (e.g., a permission) to return power to the electrical protection circuitry 46 after a shutdown of the electrical protection circuitry 46. Operators 24 may be classified based on education level, training certificates, job role, job responsibility, tracked years of experience, technical background, or the like. This information may be stored in the authentication database 228.

In response to querying the authentication database 228, the computing device 42 may generate an authentication decision indication 234. The authentication decision indication 234 may convey to the control system 44 whether to permit the operator 24 access to the electrical protection circuitry 46 (e.g., via permitting opening the electrical circuitry housing 48). In this way, the authentication decision indication 234 may be a "yes" control signal or a "no" control signal, or a data signal interpreted as such, transmitted to the control system 44 via the communication network 50 from the computing device 42.

In some cases, the computing device 42 may store the authentication decision indication 234 into an authentication log 236. The authentication log 236 may store actuation requests over time. The authentication log 236 may track which operators 24 attempted to access which devices of the industrial automation system 10. In this way, the authentication log 236 tracks both successful attempts and unsuccessful attempts. The computing device 42 may monitor the successful attempts and/or the unsuccessful attempts as a way to watch for abnormal or unexpected access attempt patterns, potential maintenance issues (e.g., if a device is having to be accessed more often), or the like.

Authentication operations may occur automatically, in response to detection of contact of the operator 24 with the handle 92. However, in some embodiments, the handle 92 may have a fourth position 238 for authentication. After authentication, the handle 92 may be able to be moved from the fourth position 238 and into the other positions 130, 132, 134 to set the operation of the respective component (e.g., electrical protection circuitry 46). The fourth position 238 may be a position between the position 132 and the position 134, however any suitable position may be used. While in the authentication fourth position 238, a light indicator may emit light to indicate that an authentication operation is ongoing. The light indicator may communicate to the operator 24 whether he or she is authenticated at a completion of the authentication operation. In some cases, the handle 92 may be positioned (e.g., four position) at least partially erect from the surface of the electrical circuitry housing 48, such that an operator 24 may is to be authenticated before the handle 92 is permitted to be positioned into a new position, such as the positions 130, 132, 134. The handle 92 may include locking circuitry and/or spring-loaded circuitry to enable the handle 92 to not be able to be positioned before suitable authentication.

Figure 16:
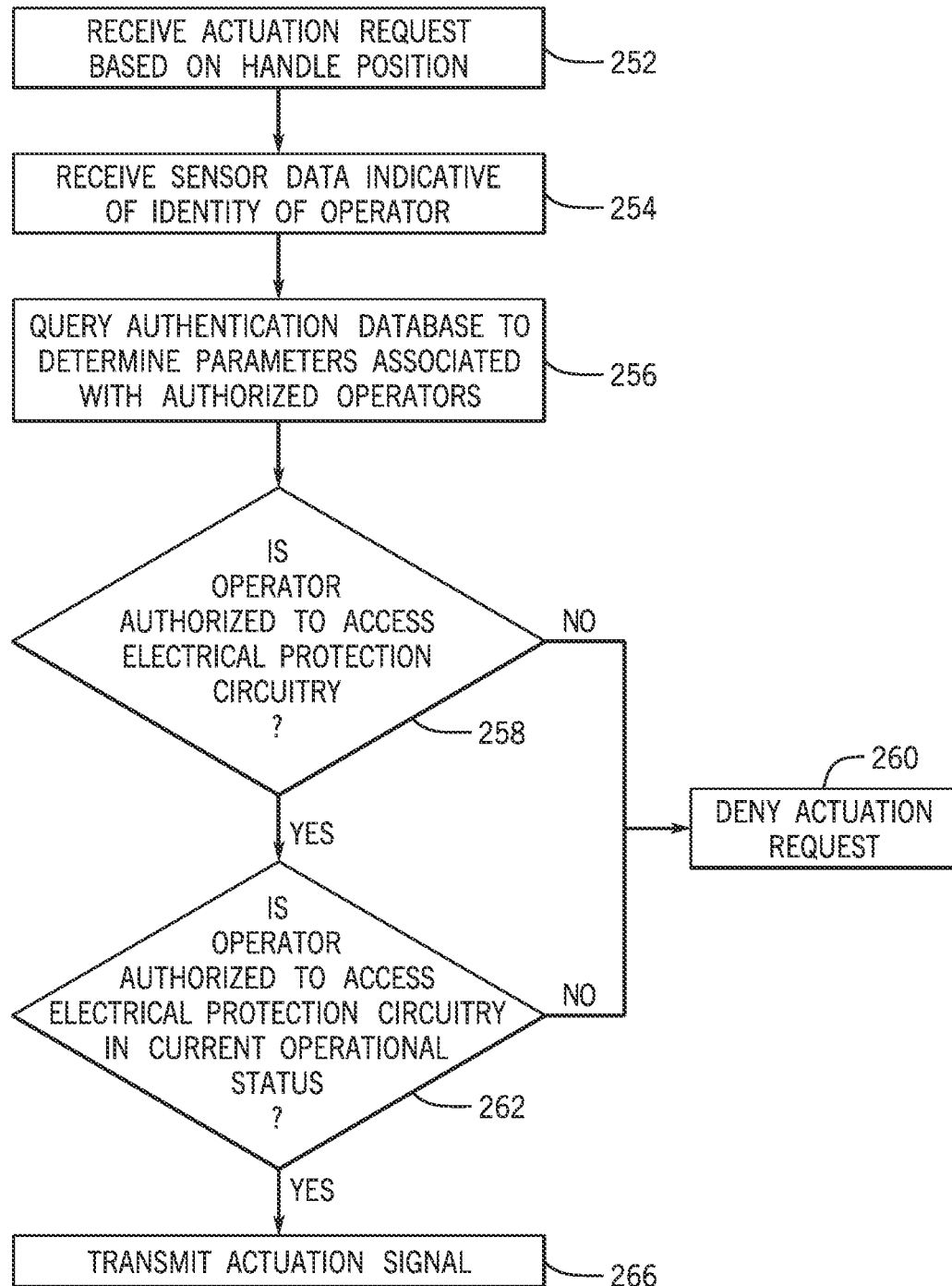
FIG. 16 is a flowchart of a method for operating authentication system of FIG. 15 to authenticate an actuation request associated with an example handle, in accordance with an embodiment.

To elaborate on the authentication operations, FIG. 16 is a flowchart of a method 250 for authenticating an operator 24 attempting to access components in the electrical circuitry housing 48 via the handle 92. Although the method 250 is described as being performed by the authentication system 226, such as via a combination of operations of the control system 44 and/or the computing device 42, it should be understood that the method 250 may be performed by any suitable component of the industrial automation system 10. For example, the control system 44, relay 112, the computing device 42, the motor drive 40, and/or any suitable processing circuitry may perform some or all of the method 250. Furthermore, some of the operations of the method 250 may be performed in any suitable order.

At block 252, the authentication system 226 may receive an actuation request based on a position of the handle 92. An operator 24 may attempting to actuate the handle 92 on the outside of the electrical circuitry housing 48. The handle 92 being operated into the fourth position 238 may generate a control signal to indicate to the authentication system 226 that an operator is attempting an actuation. In this way, the handle 92 may detect this as an actuation attempt and generate an actuation request in response to the operator 24 engaging and/or contacting the handle 92. The actuation request may be a control signal interpretable by the control system 44 and/or the computing device 42 and may initiate authentication operations.

At block 254, the authentication system 226 may receive sensor data indicative of an identity of the operator 24. The sensor data indicative of the identity of the operator 24 may be received as an identity parameter to verify a permission of an operator 24 positioning the handle 92. Details regarding the identity parameter are detailed above with respect to FIG. 15. The identity parameter may include image data, audio data, or the like associated with the operator 24 and how the operator 24 interacts with the handle 92. In some cases, the identity parameter may include a text field of alphanumeric symbols used to identify the operator 24. Any suitable identifier or identifying characteristic may be used as the identity parameter.

Based on the received actuation request and the identity parameter, at block 256, the authentication system 226 may query the authentication database 228. The computing device 42 may query the authentication database 228 on behalf of the authentication system 226. The query of the authentication database 228 may retrieve information to verify the identity parameter of the operator 24. In this way, the query of the authentication database 228 may result in a search result that lists an identity parameter for each, or a subset of, permitted operators to verify whether the identify parameter for the operator 24 is listed.

Thus, based on the identity parameter and query results from the authentication database 228, the authentication system 226 may determine, at block 258, whether the operator 24 is authorized to access the electrical protection circuitry 46. The authentication system 226 may update the authentication log 236 with the determination. If the authentication system 226 cannot match the identity parameter to the query results, the authentication system 226 may, at block 260, deny the actuation request of the operator 24. A control signal indicating the denial of the actuation request may be transmitted to the handle 92 to prevent the handle 92 from actuating or moving. The handle 92 may be prevented from moving using magnetic locks, a mechanical locking feature, or any suitable mechanism for preventing the handle 92 from moving. Alternatively, if the authentication system 226 sends the control signal indicating the denial of the actuation request, the control system 44 may not implement any of the actions or requests that are to take place based on the position of the handle 92. Additionally, in some cases, a control signal may not be sent to the handle 92. In these cases, a lack of a control signal may maintain an inaccessible state of the handle 92 and stop the operator from actuating the handle 92.

If the authentication system 226 is able to determine, at block 258, that the operator 24 is authorized to access the electrical protection circuitry 46, the authentication system 226 may check whether the operator 24 is authorized to access the electrical protection circuitry 46 in its current operational status. The current operational status may be determined using the method 200 of FIG. 14 or other suitable method (e.g., receiving an operational status from the electrical protection circuitry 46). This may be used to selectively provide access to the components of the electrical circuitry housing 48 for different classifications of operators 24. For example, a first classification of operator 24 may be permitted to access the electrical protection circuitry 46 under all operational statuses while a second classification of operator 24 may be permitted to access the electrical protection circuitry 46 during a subset of operational statuses. The current operational status may correspond to statuses described in table 1. However, in some cases, the operational status may include a status associated with whether the electrical protection circuitry 46 is "hot" or electrically coupled to the power supply 54 and/or whether a load of the electrical protection circuitry 46 is operational and/or currently performing an operation. If, at block 262, the authentication system 226 determines that the operator 24 is not authorized to access the electrical protection circuitry 46 at the current operational status, such as by determining whether the identity parameter matches an authorized operator associated with the query result, the authentication system 226 may, at block 260, deny the actuation request of the operator 24. However, if at block 258, the authentication system 226 determines that the operator is authorized to access the electrical protection circuitry 46 at the current operational status, the authentication system 226 may, at block 266, transmit an actuation signal to the handle 92 (e.g., via the control system 44) to permit the operator 24 to access the electrical protection circuitry 46.

In some cases, the authentication system 226 uses a two-factor authentication to verify the operator 24. This may include a verification of a barcode or identification associated with a card-swipe, a verification of an RFID tag of an operator 24, a push notification to the operator 24, or the like. For example, the barcode or identification of the card-swipe and/or the RFID tag may be compared to data stored in the authentication database 228 to verify an identity of the operator 24.

Furthermore, in some embodiments, it may be desired that any operator 24 be able to shut down (e.g., electrically decouple) the electrical protection circuitry 46 while restricting which classification of operator 24 are able to power on the electrical protection circuitry 46. A shut down actuation may indicate to the authentication system 226 that an abnormal or unexpected condition exists, and thus may cause the authentication system 226 to automatically generate an alarm to signal via the industrial control system 12 that a shutdown may have occurred.

In some cases, the control system 44 of the electrical protection circuitry 46 may track voltage measurements associated with the individual phases input to and output from the electrical protection circuitry 46. Since the voltages are sensed and used to determine operational statuses of the electrical protection circuitry 46, the sensed voltages may also be used to support predictive maintenance operations and historical data monitoring. For example, the control system 44 may store locally or in a storage component of the industrial control system 12 the sensed voltages over time to help generate historical data logs of the individual phase voltages. The sensed voltages may also be associated with a time stamp. For example, the location sensor 78 of the control system 44 may receive a remotely-managed time at a time of sensing and associate that time with the sensed voltage in memory. Furthermore, the sensed voltages of the individual phases may be transmitted via the communication network 50 to the computing device 42, the display/operator interface 20, an additional control system 44, or the like to provide the industrial control system 12 with improved monitoring data of the industrial automation system 10.

The electrical protection circuitry 46 may sometimes lose an electrical coupling to the power supply 54. In these cases, it may be desired to continue to supply the electrical status indication system 118 with electrical power. To do so, a capacitor or battery may be used to provide electrical power after electricity is removed from the electrical status indication system 118. In other embodiments, a power-over Ethernet connection may be used to supply power to the electrical status indication system 118. Furthermore, a battery may be used to supply power to the electrical status indication system 118. It is noted that a combination of the capacitor, power-over Ethernet, battery, or the like may be used to supply backup power to the electrical status indication system 118 in case of power loss.

It is noted that although certain colors are described as being used to represent certain states, any color may be used to represent the states. For example, an "on" state may be communicated via a pink or purple light instead of a red light. Furthermore, a variety of lighting patterns, colors, or the light could be used instead of a solid color. For example, a "trip" state may be communicated through a red and white strobe pattern, or other suitable light pattern or color.

Technical effects of the present disclosure include improving control operations of an industrial control system by using systems and methods that enable an operator to visually verify operational statuses of electrical protection circuitry of an industrial automation system. The electrical protection circuitry may operate to update the operational status without intervention or verification by the operator. In this way, an amount of time that the operator spends exposed to relatively high voltages and/or internal circuitry of the electrical protection circuitry may be reduced since the electrical protection circuitry may perform verification operations. The electrical protection circuitry may provide a visual indicator to the operator via status indicators and/or individual phase status indicators. The status indicators may visually present an operational status of one or more aspects of the electrical protection circuitry. In some embodiments, a handle of a housing for the electrical protection circuitry may be outfitted or retrofitted with a status indicator mounted on a bezel of the handle. Furthermore, in some embodiments, the handle of the housing may include authentication circuitry or cause a performance of authentication operations once the handle is actuated into an actuation position. The handle providing visual status indicators and/or authentication operations may improve control operations of the industrial automation system by improving a reliability and speed of verification since the verification is automated via the electrical protection circuitry and results displayed via the handle, in additional to improving a security of the electrical protection circuitry by permitting access to authorized operators.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
   electrical protection circuitry coupled between a power supply and a load, wherein the electrical protection circuitry is configured to electrically couple the power supply to the load;
   a handle disposed on an outer surface of a housing of the electrical protection circuitry, wherein the handle is configured to provide access to at least a portion of the electrical protection circuitry;
   a status indicator configured to emit light in response to a control signal, wherein the status indicator is disposed around the handle on the outer surface of the housing, wherein the status indicator is disposed partially around the handle such that at least a portion of a circumference of the handle is disposed adjacent to an edge of the status indicator; and
   control circuitry configured to:
     detect a state of the electrical protection circuitry; and
     transmit the control signal to the status indicator based on the state, wherein the control signal is configured to control one or more properties of the light emitted by the status indicator.

2. The system of claim 1, wherein the power supply is coupled to the electrical protection circuitry via three electrical lines, wherein the status indicator comprises three light indicators, and wherein each of the three light indicators corresponds to a respective one of the three electrical lines.

3. The system of claim 2, wherein a respective property of the one or more properties of the light emitted by a respective light indicator of the three light indicators of the status indicator is based at least in part on an operation of a respective electrical line of the three electrical lines.

4. The system of claim 1, wherein the one or more properties comprise a color of the light or a frequency of emission of the light.

5. The system of claim 1, wherein the status indicator is disposed around the handle such that the circumference of the handle is disposed adjacent to the edge of the status indicator.

6. The system of claim 1, wherein the status indicator comprises six light indicators, wherein three electrical lines corresponding to three electrical phases couple the power supply to the load, and wherein each of the six light indicators corresponds to an electrical status of a respective electrical line of the three electrical lines.

7. The system of claim 1, wherein the control circuitry is configured to detect the state of the electrical protection circuitry based on data received from a sensor, wherein the data comprises an indication that the power supply is electrically coupled to the load via the electrical protection circuitry.

8. The system of claim 1, wherein the status indicator is configured to be installed around the handle after a time of initial manufacturing of the handle.

9. The system of claim 1, wherein the control circuitry is configured to change one or more operations of one or more industrial components in an industrial automation system in response to the state.

10. The system of claim 1, wherein the status indicator comprises seven light indicators, wherein three electrical lines corresponding to three electrical phases couple the power supply to the load, and a control supply electrical line corresponding to a control power supply couple a control power supply to the load, and wherein each of the seven light indicators corresponds to an electrical status of a respective electrical line of the three electrical lines and the control supply electrical line.

11. A device, comprising:
    a handle disposed on a handle base, wherein the handle is configured to rotate about an axis central to the handle base; and
    a status indicator light configured to emit light, wherein the status indicator light is configured to receive power from electrical supply circuitry disposed within electrical circuitry housing, and wherein the status indicator light is disposed around the handle base on an outer surface of the electrical circuitry housing and is configured to fit within a bezel region disposed at least partially between the handle base and the outer surface of an electrical circuitry housing when the handle is positioned on an opening of the electrical circuitry housing.

12. The device of claim 11, wherein the status indicator light comprises:
    a first light indicator configured to change a first property based on a first operational state of the electrical supply circuitry; and
    a second light indicator configured to change a second property based on a second operational state of the electrical supply circuitry.

13. The device of claim 12, wherein the first property and the second property are associated with a color emitted by the first light indicator and the second light indicator.

14. The device of claim 12, wherein the first property and the second property are associated with a pattern emitted by the first light indicator and the second light indicator.

15. The device of claim 11, wherein the status indicator light is embedded within a base of the handle.

16. A tangible, non-transitory computer-readable medium configured to store instructions executable by a processor of an electronic device that, when executed by the processor, cause the processor to:
    receive a first state of an electrical device, wherein the electrical device is configured to couple a power supply to a load;
    receive a position of a handle configured to provide access to at least a portion of the electrical device disposed within a housing of the electrical device; and transmit a control signal to a status indicator based on the first state and the position, wherein the control signal is configured to control one or more properties of light emitted by the status indicator, and wherein the status indicator is disposed adjacent to the handle around the handle on an outer surface of the housing.

17. The non-transitory computer-readable medium of claim 16, comprising instructions that cause the processor to:

receive a line status associated with the first state of the electrical device, wherein the line status indicates whether the electrical device is electrically coupled to the power supply or the load; and generate the control signal in response to the line status.

18. The non-transitory computer-readable medium of claim 16, wherein the first state of the electrical device is represented by the one or more properties of the light emitted by the status indicator.

19. The non-transitory computer-readable medium of claim 18, comprising instructions that cause the processor to:

receive a second state of the electrical device;

transmit a second control signal to a first light indicator of the status indicator based at least in part on the first state; and transmit a third control signal to a second light indicator of the status indicator based at least in part on the second state.

20. The non-transitory computer-readable medium of claim 16, comprising instructions that cause the processor to:

transmit additional control signals to the status indicator to cause three light indicators to emit light according to the additional control signals.

21. The non-transitory computer-readable medium of claim 16, wherein the electrical device comprises a circuit breaker.

* * * * *